United States Patent
Shin et al.

(10) Patent No.: US 11,347,066 B2
(45) Date of Patent: May 31, 2022

(54) DISPLAY APPARATUS CAPABLE OF MULTI-DEPTH EXPRESSION

(71) Applicant: SAMSUNG ELECTRONICS CO., LTD., Suwon-si (KR)

(72) Inventors: Bongsu Shin, Seoul (KR); Geeyoung Sung, Daegu (KR); Hongseok Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 113 days.

(21) Appl. No.: 16/834,401

(22) Filed: Mar. 30, 2020

(65) Prior Publication Data
US 2021/0132396 A1 May 6, 2021

(30) Foreign Application Priority Data
Oct. 31, 2019 (KR) .................. 10-2019-0138196

(51) Int. Cl.
*G02B 27/10* (2006.01)
*G03H 1/00* (2006.01)
(Continued)

(52) U.S. Cl.
CPC ....... *G02B 27/0176* (2013.01); *F16M 11/048* (2013.01); *F16M 11/18* (2013.01);
(Continued)

(58) Field of Classification Search
CPC ......... C09K 9/02; B43L 13/18; H04N 9/3197; G02C 5/00; G02C 7/04; G02C 7/02;
(Continued)

(56) References Cited

U.S. PATENT DOCUMENTS

| | | | |
|---|---|---|---|
| 10,610,775 B1* | 4/2020 | Ebert | G06T 19/006 |
| 2015/0279102 A1* | 10/2015 | Fleck | G06F 3/012 |
| | | | 345/419 |

(Continued)

FOREIGN PATENT DOCUMENTS

| | | |
|---|---|---|
| JP | 2008-20813 A | 1/2008 |
| KR | 10-2014-0095840 A | 8/2014 |

(Continued)

OTHER PUBLICATIONS

Communication dated Jan. 12, 2021 by the European Patent Office in corresponding European Application No. 20187457.5.

*Primary Examiner* — Dawayne Pinkney
(74) *Attorney, Agent, or Firm* — Sughrue Mion, PLLC

(57) ABSTRACT

Provided is a display apparatus including an image forming device configured to form an image, an optical system configured to provide an output image by combining light containing an outside landscape with the image formed by the image forming device, and a driving device configured to adjust a distance between the image forming device and the optical system, wherein the driving device includes a fixed frame, a movable frame which faces the fixed frame and is movable, an actuator configured to change a distance between the fixed frame and the movable frame, and a fixing member configured to fix the distance between the fixed frame and the movable frame, wherein the image forming device is fixed to the movable frame.

26 Claims, 18 Drawing Sheets

(51) Int. Cl.
*G02F 1/03* (2006.01)
*G02B 27/14* (2006.01)
*G09G 3/19* (2006.01)
*G02B 27/01* (2006.01)
*F16M 11/04* (2006.01)
*F16M 11/18* (2006.01)

(52) U.S. Cl.
CPC . *F16M 2200/061* (2013.01); *F16M 2200/066* (2013.01); *G02B 2027/0159* (2013.01); *G02B 2027/0163* (2013.01); *G02B 2027/0178* (2013.01)

(58) Field of Classification Search
CPC .......... A61B 3/103; A61B 3/14; A61B 3/113; A61B 3/1225; A61B 3/024; G02F 1/155; G02F 1/1523; G02F 1/1525; G02F 1/1521; G02F 1/1533; G02F 1/03; G02F 1/02; B60R 1/088; B82Y 20/00; G02B 27/0103; G02B 27/0172; G02B 27/0149; G02B 27/145; G02B 27/143
USPC .......... 359/265–275, 13, 277, 245–247, 242, 359/630–636; 345/49, 105; 351/41, 351/205–206, 209–210, 221, 222, 159.01, 351/159.74–159.76
See application file for complete search history.

(56) References Cited

U.S. PATENT DOCUMENTS

| | | |
|---|---|---|
| 2017/0160798 A1 | 6/2017 | Lanman et al. |
| 2019/0346058 A1 | 11/2019 | Murison |
| 2020/0125227 A1 | 4/2020 | Shin et al. |
| 2020/0294190 A1 | 9/2020 | Shin et al. |
| 2021/0020081 A1 | 1/2021 | Shin et al. |

FOREIGN PATENT DOCUMENTS

| | | |
|---|---|---|
| KR | 10-2020-0108666 A | 9/2020 |
| WO | 01-033282 A1 | 5/2001 |
| WO | 2018-119508 A1 | 7/2018 |
| WO | 2018/196968 A1 | 11/2018 |

* cited by examiner

DISPLAY APPARATUS CAPABLE OF MULTI-DEPTH EXPRESSION

CROSS-REFERENCE TO RELATED APPLICATION

This application claims priority from Korean Patent Application No. 10-2019-0138196, filed on Oct. 31, 2019, in the Korean Intellectual Property Office, the disclosure of which is incorporated herein in its entirety by reference.

BACKGROUND

1. Field

Example embodiments of the present disclosure relate to a display apparatus capable of multi-depth expression, and more particularly, to a display apparatus capable of multi-depth expression and configured to reduce power consumption in a depth maintaining state.

2. Description of Related Art 3D image display technology has been used in various fields, and recently, the application of 3D image display technology has also been extended to image devices related to virtual reality (VR) displays and augmented reality (AR) displays.

Head mounted displays providing VR have been commercially available and widely used in the entertainment industry. In addition, head mounted displays have been developed into types applicable to the fields of medicine, education, and other industries.

AR displays, an advanced form of VR displays, are image devices combining the real world with VR and capable of bringing out interactions between reality and VR. The interaction between reality and VR is based on the function of providing real-time information about real situations, and the effect of reality is further increased by overlaying virtual objects or information on a real-world environment.

In these devices, a stereoscopy technique is commonly used for displaying three-dimensional (3D) images, and in this case, the alignment of a display with an optical system may be a problem in a process of changing the distance between the display and the optical system for multi-depth expression. Accordingly, there are attempts to find a 3D image display method for more precise alignment between a display and an optical system.

SUMMARY

One or more example embodiments provide display apparatuses capable of multi-depth expression and having an actuator structure for reducing power consumption in a depth maintaining state.

Additional aspects will be set forth in part in the description which follows and, in part, will be apparent from the description, or may be learned by practice of the example embodiments of the disclosure.

According to an aspect of an example embodiment, there is provided a display apparatus including an image forming device configured to form an image, an optical system configured to provide an output image by combining light containing an outside landscape with the image formed by the image forming device, and a driving device configured to adjust a distance between the image forming device and the optical system, wherein the driving device includes a fixed frame, a movable frame which faces the fixed frame and is movable, an actuator configured to change a distance between the fixed frame and the movable frame, and a fixing member configured to fix the distance between the fixed frame and the movable frame, wherein the image forming device is fixed to the movable frame.

The actuator may include a first elastic bridge having a curved surface which is convex toward the fixed frame, a second elastic bridge having a curved surface which is convex toward the movable frame, and a variable length element fixed between both ends of the first elastic bridge and both ends of the second elastic bridge, and respectively having a length that is variable.

The variable length element may include a shape memory alloy or an electroactive polymer, and the length of the variable length element may change based on an electrical control.

The first elastic bridge may have elastic restoring force in a direction in which a radius of curvature of the first elastic bridge increases, and a center portion of the first elastic bridge is fixed to the fixed frame.

The second elastic bridge may have elastic restoring force in a direction in which a radius of curvature of the second elastic bridge increases, and a center portion of the second elastic bridge is fixed to the movable frame.

The fixing member may include a pair of side frames respectively fixed to opposite side edges of the fixed frame.

The pair of side frames may extend from the fixed frame toward the movable frame, and the pair of side frames may have fixed ends fixed to the fixed frame and free ends which are opposite the fixed ends.

The pair of side frames may include a plurality of protrusions which protrude from surfaces of the free ends and are provided at different distances from the fixed frame, the plurality of protrusions being configured to contact with opposite sides of the movable frame and restrain movement of the movable frame.

The pair of side frames may be configured such that the free ends of the pair of side frames which face each other move away from each other while the distance between the fixed frame and the movable frame is changed and move closer to each other while the distance between the fixed frame and the movable frame is maintained.

The pair of side frames may include bimetal or piezoelectric elements which respectively bend or stretch based on a temperature control or an electrical control, and the pair of side frames may be bent while the distance between the fixed frame and the movable frame is changed, and may be stretched while the distance between the fixed frame and the movable frame is maintained.

The fixing member may further include variable length elements fixed between the fixed ends and the free ends and having variable lengths, the pair of side frames may have elastic restoring force in directions in which the free ends face each other, and the variable length elements fixed between the fixed ends and the free ends may be contracted based on the distance between the fixed frame and the movable frame being changed.

The fixing member may include a pair of first rods configured to rotate and provided at both side edges of the fixed frame, and a pair of second rods configured to rotate and provided at both side edges of the movable frame, wherein end portions of the pair of first rods and end portions of the pair of second rods corresponding to the end portions of the pair of first rods are configured to contact each other and interfere with each other.

The fixing member may be configured to be switched between a first state in which the pair of first rods and the pair of second rods corresponding to the pair of first rods are fixed in a straight line with each other and a second state in which the pair of first rods and the pair of second rods corresponding to the pair of first rods are fixed at an inclined angle with respect to each other.

The fixing member may be switched from the second state to the first state based on the distance between the fixed frame and the movable frame being increased, and is switched from the first state to the second state based on the distance between the fixed frame and the movable frame being decreased.

The end portions of the pair of first rods may include recesses and barriers surrounding the recesses, wherein a width of each of the end portions of the pair of second rods is less than a width of each of the recesses, and each of the end portions of the pair of second rods are provided in each of the recesses, and wherein the fixing member is configured such that the end portions of the pair of second rods are in contact with bottom surfaces of the recesses in the first state and are in contact with inner walls of the barriers in the second state.

The end portions of the pair of second rods may include recesses and barriers surrounding the recesses, wherein a width of each of the end portions of the pair of first rods is less than a width of each of the recesses and each of the end portions of the pair of first rods are provided in each of the recesses, and wherein the fixing member is configured such that the end portions of the pair of first rods are in contact with bottom surfaces of the recesses in the first state and are in contact with inner walls of the barriers in the second state.

The fixing member may further include variable length elements respectively connected between both side edges of the fixed frame and the end portions of the pair of first rods and respectively having a length that is variable, and the variable length elements respectively connected between both side edges of the fixed frame and the end portions of the pair of first rods may be contracted based on the fixing member being switched from the first state to the second state.

The fixing member may further include variable length elements respectively connected between both side edges of the movable frame and the end portions of the pair of second rods, and respectively having a length that is variable, and the variable length elements respectively connected between both side edges of the movable frame and the end portions of the pair of second rods may be contracted based on the fixing member being switched from the first state to the second state.

The end portions of the pair of first rods and the end portions of the pair of second rods corresponding to the end portions of the pair of first rods may have complementary shapes and are configured to be engaged with each other, wherein the fixing member may further include variable length elements respectively connected between both side edges of the movable frame and the end portions of the pair of second rods, and respectively having a length that is variable, and wherein the variable length elements respectively connected between both side edges of the movable frame and the end portions of the pair of second rods may be contracted based on the fixing member being switched from the first state to the second state.

The fixing member may include a pair of first rods configured to rotate and provided at both side edges of the fixed frame, and a pair of second rods configured to rotate and provided at both side edges of the movable frame, wherein end portions of the pair of first rods and end portions of the pair of second rods corresponding to the end portions of the pair of first rods are configured to contact each other and interfere with each other.

The actuator may include first variable length elements connected between the fixed frame and inner lateral surfaces of the pair of first rods, and respectively having a length that is variable, and second variable length elements connected between the fixed frame and outer lateral surfaces of the pair of first rods, and respectively having a length that is variable.

The fixing member may be configured to be switched between a first state in which the pair of first rods and the pair of second rods corresponding to the pair of first rods are fixed in a straight line with each other and a second state in which the pair of first rods and the pair of second rods corresponding to the pair of first rods are fixed at an inclined angle with respect to each other, wherein based on the distance between the fixed frame and the movable frame being increased, the first variable length elements are shortened and the second variable length elements are elongated to switch the fixing member from the second state to the first state, and based on the distance between the fixed frame and the movable frame being decreased, the first variable length elements are elongated and the second variable length elements are shortened to switch the fixing member from the first state to the second state.

The actuator may include first variable length elements connected between the movable frame and inner lateral surfaces of the pair of second rods, and respectively having a length that is variable, and second variable length elements connected between the movable frame and outer lateral surfaces of the pair of second rods, and respectively having a length that is variable.

The display apparatus may further include a processor configured to determine the distance between the image forming device and the optical system based on depth information of the image to be displayed and control the driving device.

The display apparatus may be a virtual reality (VR), augmented reality (AR), or mixed reality (MR) display apparatus which is implemented in a head mounted type apparatus, a glasses type apparatus, or a goggle type apparatus.

According to another aspect of an example embodiment, there is provided a display apparatus including an image forming device configured to form an image, an optical system configured to provide combine the image formed by the image forming device and light provided from an outside of the display apparatus, and a driving device configured to change a distance between the image forming device and the optical system, wherein the driving device includes a fixed frame, a movable frame which faces the fixed frame and is movable, an actuator configured to control a distance between the fixed frame and the movable frame based on a voltage applied, and a fixing member configured to fix the distance between the fixed frame and the movable frame.

The voltage may be applied while the distance between the fixed frame and the movable frame changes, and the voltage may not be applied while the distance between the fixed frame and the movable frame is maintained.

BRIEF DESCRIPTION OF THE DRAWINGS

The above and/or other aspects, features, and advantages of example embodiments will be more apparent from the following description taken in conjunction with the accompanying drawings, in which.

DETAILED DESCRIPTION

Figure 1:
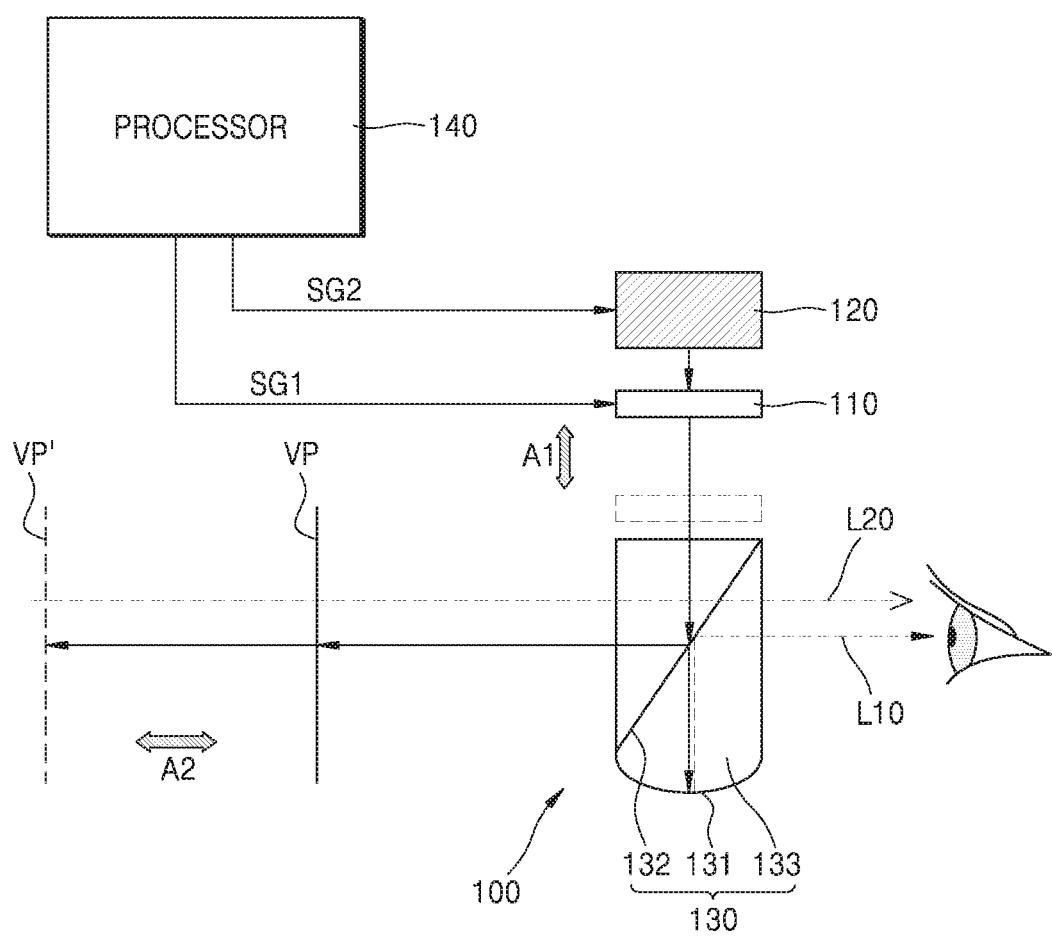
FIG. 1 is a schematic view schematically illustrating a structure and operation of a display apparatus according to an example embodiment.

Reference will now be made in detail to example embodiments of which are illustrated in the accompanying drawings, wherein like reference numerals refer to like elements throughout. In this regard, the example embodiments may have different forms and should not be construed as being limited to the descriptions set forth herein. Accordingly, the example embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

Hereinafter, display apparatuses capable of multi-depth expression will be described with reference to the accompanying drawings. In the drawings, like reference numerals refer to like elements, and the sizes of elements may be exaggerated for clarity of illustration. Example embodiments described herein are for illustrative purposes only, and various modifications may be made therefrom. In the following description, when an element is referred to as being "above" or "on" another element in a layered structure, it may be directly on an upper, lower, left, or right side of the other element while making contact with the other element or may be above an upper, lower, left, or right side of the other element without making contact with the other element.

FIG. 1 is a schematic view schematically illustrating a structure and operation of a display apparatus 100 according to an example embodiment. Referring to FIG. 1, the display apparatus 100 of the example embodiment may include an image forming device 110 configured to form images, a combiner member 130, for example, a light system, an optical system, or an optical device, configured to provide images formed by the image forming device 110 together with light containing and propagating from an outside landscape, a driving device 120 configured to adjust the distance between the image forming device 110 and the combiner member 130, and a processor 140 configured to control the image forming device 110 and the driving device 120 according to information about the depths of images to be displayed.

The image forming device 110 forms images by modulating light according to information on images to be provided to a viewer. Images formed by the image forming device 110 may be, for example, stereo images which are respectively provided to the left eye and the right eye of the viewer, holographic images, light field images, or integral photography (IP) images, and may include multi-view images or super multi-view images. In addition, images formed by the image forming device 110 may be general two-dimensional images, but embodiments are not limited thereto.

For example, the image forming device 110 may include a liquid crystal on silicon (LCoS) device, a liquid crystal display (LCD) device, an organic light emitting diode (OLED) display device, or a digital micromirror device (DMD). In addition, the image forming device 110 may include a next generation display device such as a micro LED display device or a quantum dot (QD) LED display device. When the image forming device 110 is a self-emissive display device such as an OLED display device or a micro LED, the image forming device 110 may include only one display panel. When the image forming device 110 is a non-emissive display device such as an LCoS device or an LCD device, the image forming device 110 may further include a light source configured to provide illumination light and a beam splitter configured to adjust the path of illumination light.

The combiner member 130 may change the path of an image formed by the image forming device 110 and output the image such that the image may have a size suitable for the viewer's field of view and may be delivered to a viewer's eye. The combiner member 130 may include a focusing optical system 131 and may also include a beam splitter 132 configured to change the path of light by splitting the light. The focusing optical system 131 may be an imaging member having refractive power and configured to enlarge or reduce images formed by the image forming device 110. In FIG. 1, the focusing optical system 131 is illustrated as a concave mirror, but embodiments are not limited thereto. For example, the focusing optical system 131 may be provided as a combination of a convex lens, a concave lens, and the like.

The beam splitter 132 may be a half mirror that transmits a portion of incident light and reflects the other portion of the incident light. However, embodiments are not limited thereto. For example, the beam splitter 132 may be a polarization beam splitter that transmits or reflects incident light according to the polarization of the incident light. When the beam splitter 132 is a polarization beam splitter, additional optical elements for polarization conversion may be further included in the combiner member 130.

As shown in FIG. 1, the combiner member 130 may have an integrated structure in which the focusing optical system 131 and the beam splitter 132 are fixed through a transparent light guide plate 133. For example, the beam splitter 132 may be arranged in a diagonal direction inside the light guide plate 133, and an end portion of the light guide plate 133 may have a convexly curved surface. A concave mirror may be formed on the end portion of the light guide plate 133 by coating the convexly curved surface of the light guide plate 133 with a reflective film. In this example embodiment, an image formed by the image forming device 110 enters the inside of the light guide plate 133 through a light entrance surface of the light guide plate 133. Thereafter, the image may be transmitted through the beam splitter 132, enlarged and reflected by the focusing optical system 131, and then reflected by the beam splitter 132 onto the viewer's eye. However, this is an example, and the structure of the combiner member 130 is not limited thereto.

The combiner member 130 may not only transmit light L10 containing an image formed by the image forming device 110 to the viewer's eye, but may also transmit light L20 containing and propagating from a front outside landscape to the viewer's eye. For example, the light guide plate 133 and the beam splitter 132 of the combiner member 130 may be configured to transmit the light L20 containing and propagating from the outside landscape. The light L20 propagating from the outside does not contain an artificial image displayed by a separate display device, but contains an actual foreground existing in front of the viewer. Therefore, the viewer may simultaneously recognize the actual foreground and a virtual image which is artificially generated by the image forming device 110. Therefore, the display apparatus 100 may function as a see-through-type display. In this regard, the display apparatus 100 of the example embodiment may be used for implementing augmented reality (AR) or mixed reality (MR). For example, the display apparatus 100 of the example embodiment may be a near-eye AR display apparatus.

The combiner member 130 is not limited to the illustrated shape and structure. Additional optical elements may be further provided to transmit an image formed by the image forming device 110 to a viewer's pupil together with a real-environment image of the front side of the viewer, and optical windows having various shapes and structures may be employed.

As described above, an image formed by the image forming device 110 reaches the viewer's eye along a propagating path in which the image is transmitted through the beam splitter 132, reflected by the focusing optical system 131, and then reflected by the beam splitter 132. In the propagating path, the viewer recognizes a virtual image formed on a virtual image plane VP which is at a position in front of the viewer, and the depth of the virtual image, which the viewer recognizes, varies depending on the position of the virtual image plane VP.

The display apparatus 100 of the example embodiment may change the position of the virtual image plane VP to reflect the depth of the image to be displayed rather than fixing the position of the virtual image plane VP. To this end, the display apparatus 100 may include the driving device 120 configured to change the position of the image forming device 110. The driving device 120 may move the image forming device 110 in parallel such that the distance between the image forming device 110 and the focusing optical system 131 of the combiner member 130 may change. Then, when the position of the image forming device 110 is changed in directions A1, the position of the virtual image plane VP may be changed in directions A2. For example, when the image forming device 110 is moved away from the focusing optical system 131 of the combiner member 130, the depth of an image that the viewer feels may be increased by an amount from the virtual image plane VP to a virtual image plane VP'.

The processor 140 may generate a light modulation signal SG1 and a driving signal SG2 which are to be respectively transmitted to the image forming device 110 and the driving device 120 according to information about an image that the viewer will recognize. The image forming device 110 and the driving device 120 may be controlled respectively by the light modulation signal SG1 and the driving signal SG2 generated by the processor 140. For example, the image forming device 110 forms an image based on the light modulation signal SG1 provided from the processor 140. In addition, the driving device 120 adjusts the position of the image forming device 110 based on the driving signal SG2 provided from the processor 140 such that the virtual image plane VP may be positioned in accordance with the depth of the image formed by the image forming device 110. To this end, the processor 140 may generate the driving signal SG2 by determining the distance between the image forming device 110 and the combiner member 130 based on information about the depth of the image which is included in the light modulation signal SG1 to be transmitted to the image forming device 110.

Image information may include pixel-specific data, related to color values of a plurality of pixels, and depth information associated with the positions of the virtual image plane VP to which the images are respectively to be formed, for each of a plurality of frame images to be provided to the viewer. The processor 140 may generate, as the light modulation signal SG1, an electrical signal for implementing color values determined by referring to the pixel-specific data included in the image information. In addition, the processor 140 may generate the driving signal SG2 to place the image forming device 110 such that the virtual image plane VP may be formed at a position corresponding to a representative depth value which is set with reference to the depth information. When the light modulation signal SG1 and the driving signal SG2 generated by the processor 140 are respectively transmitted to the image forming device 110 and the driving device 120, the viewer may recognize an image from the position of the virtual image plane VP which corresponds to the depth of the image.

In addition, the driving signal SG2 for driving the driving device 120 may be transmitted after a predetermined delay time from the transmission time of the light modulation signal SG1. For example, the predetermined delay time may be set to be greater than the convergence-accommodation time of the viewer's eye that is the time necessary for the human eye to perceive an image at a changed depth position.

The driving device 120 employed in the display apparatus 100 of the example embodiment may include a shape-variable material to widen the position driving range of the image forming device 110 while reducing the volume of the driving device 120 as much as possible. For example, the driving device 120 may move the image forming device 110 while being changed in shape according to a signal applied to the driving device 120. For this variable shape, the driving device 120 may include a material of which the shape is changed in a certain condition. For example, FIGS. 2A and 2B are views schematically illustrating a structure and operation of the driving device 120 according to an example embodiment.

Figure 2A:
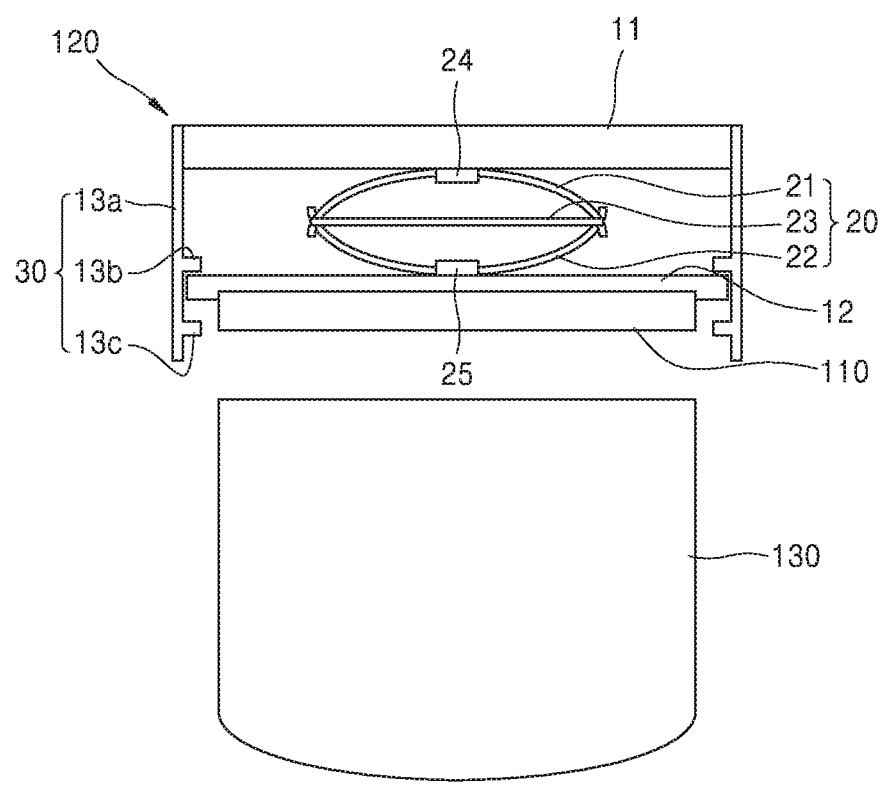
FIGS. 2A and 2B are views schematically illustrating a structure and operation of a driving device according to an example embodiment.
Figure 2B:
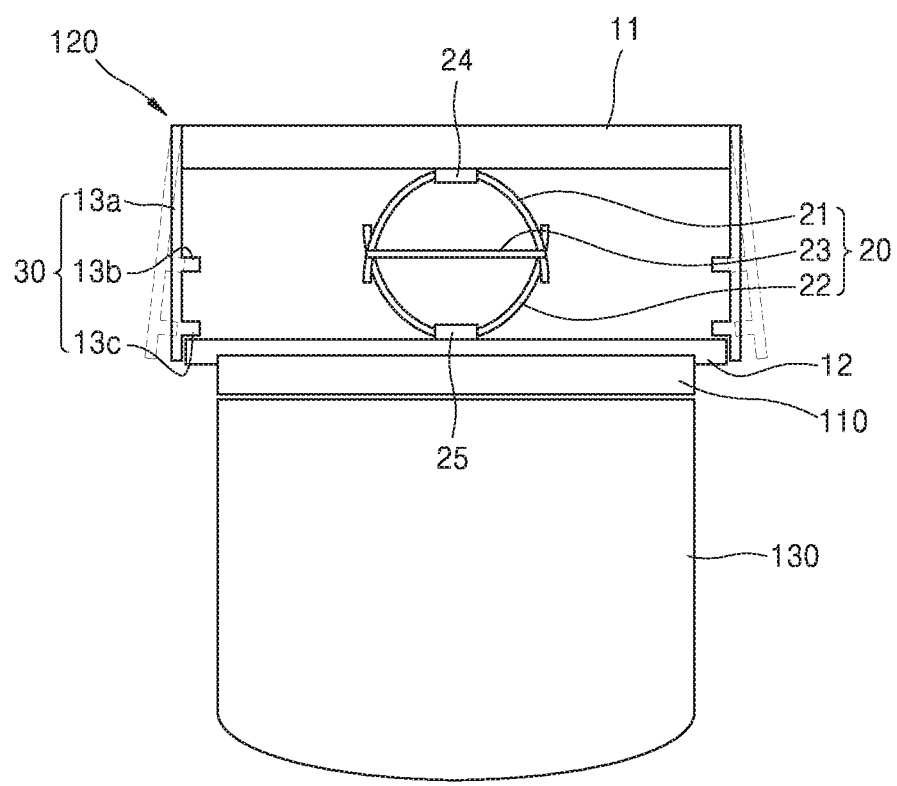

Referring to FIG. 2A, the driving device 120 may include a fixed frame 11 which is fixed to the inside of the display apparatus 100, a movable frame 12 which is arranged to face the fixed frame 11 and is movable, an actuator 20 which is configured to change the distanced between the fixed frame 11 and the movable frame 12, and a fixing member 30 configured to fix the distance between the fixed frame 11 and the movable frame 12. The fixed frame 11 and the movable frame 12 may have flat plate shapes which are parallel to each other. The movable frame 12 may be configured to be movable in a direction perpendicular to a surface facing the fixed frame 11. In addition, the driving device 120 may further include a driving circuit for applying a driving voltage to the actuator 20 under the control of the processor 140.

The image forming device 110 may be fixed to a lower surface of the movable frame 12 and may face the light entrance surface of the combiner member 130. For example, the image forming device 110 may be a display panel of a self-emissive display device.

The actuator 20 may be configured to move the movable frame 12 to change the distance between the fixed frame 11 and the movable frame 12. For example, the actuator 20 may include a first elastic bridge 21 having a curved surface which is convex toward the fixed frame 11, a second elastic bridge 22 having a curved surface which is convex toward the movable frame 12, and a variable length element 23 fixed between both ends of the first elastic bridge 21 and both ends of the second elastic bridge 22 and having a variable length.

The first elastic bridge 21 and the second elastic bridge 22 may include a plate-like elastic material such as a metal or plastic. Since both ends of the first elastic bridge 21 and both ends of the second elastic bridge 22 are fixed to the variable length element 23 which is shorter than the length of the first elastic bridge 21 and the length of the second elastic bridge 22, respectively, the first elastic bridge 21 and the second elastic bridge 22 may be curved in an arch shape by the variable length element 23. Therefore, each of the first elastic bridge 21 and the second elastic bridge 22 has elastic restoring force in a direction in which the radius of curvature thereof increases. A convex center portion of the first elastic bridge 21 may be fixed to a lower surface of the fixed frame 11, for example, by using a fixing plate 24. In addition, a convex center portion of the second elastic bridge 22 may be fixed to an upper surface of the movable frame 12, for example, by using a fixing plate 25. Then, when the first elastic bridge 21 and the second elastic bridge 22 are elastically deformed, the convex center portion of the first elastic bridge 21 may not move on the lower surface of the fixed frame 11, and the convex center portion of the second elastic bridge 22 may not move on the upper surface of the movable frame 12.

The variable length element 23 may be configured to be changed in length by electrical control. For example, the variable length element 23 may include a material such as a shape memory alloy (SMA) or an electroactive polymer which is deformable into a predetermined shape by a certain drive signal. The SMA may include, for example, a nickel-titanium (Ni—Ti) alloy, a copper-zinc (Cu—Zn) alloy, a gold-cadmium (Au—Cd) alloy, an indium-titanium (In—Ti) alloy, or the like. In this case, when a driving voltage is applied to the variable length element 23, heat may be generated in the variable length element 23, and the variable length element 23 may contract because of the heat. In addition, when the driving voltage is not applied to the variable length element 23, the variable length element 23 may extend to its original length.

The fixing member 30, which fixes the distance between the fixed frame 11 and the movable frame 12 while the movable frame 12 is not moving, may include, for example, a pair of side frames 13a respectively fixed to both side edges of the fixed frame 11. Each of the pair of side frames 13a may include a plate-shaped elastic material extending in a direction from the fixed frame 11 toward the movable frame 12. In addition, the pair of side frames 13a may include fixed ends which are fixed to the fixed frame 11 and free ends which are opposite the fixed ends. The free ends of the pair of side frames 13a may face both sides of the movable frame 12.

In addition, the pair of side frames 13a may include a plurality of first and second protrusions 13b and 13c protruding from surfaces of the free ends such that the first protrusion 13b and the second protrusion 13c may make contact with both sides of the movable frame 12 to restrain the movable frame 12 from moving. The first protrusion 13b and the second protrusion 13c may be located at different distances from the fixed frame 11 in the direction from the fixed frame 11 toward the movable frame 12. For example, the first protrusions 13b may be arranged at a first distance from the fixed frame 11, and the second protrusions 13c may be are arranged at a second distance from the fixed frame 11 which is greater than the first distance. Thus, when both sides of the movable frame 12 are in contact with the first protrusions 13b, the movable frame 12 may be fixed at the first distance from the fixed frame 11, and when both sides of the movable frame 12 are in contact with the second protrusions 13c, the movable frame 12 may be fixed at the second distance from the fixed frame 11.

In an initial state, the variable length element 23 may not be contracted. In addition, as shown in FIG. 2A, both sides of the movable frame 12 may be located between the first protrusions 13b and the second protrusions 13c. The movable frame 12 may be forced to move toward the fixed frame 11 because of the elastic restoring force of the first elastic bridge 21 and the second elastic bridge 22. Therefore, both sides of the movable frame 12 are brought into contact with the first protrusions 13b and are not further moved toward the fixed frame 11 because of the first protrusions 13b, such that the position of the movable frame 12 is fixed. Then, the image forming device 110 fixed to the movable frame 12 is also fixed at a position relatively distant from the combiner member 130.

When the driving device 120 applies a driving voltage to the variable length element 23 under the control of the processor 140, the variable length element 23 contracts such that both ends of the first elastic bridge 21 may be pulled close to each other and both ends of the second elastic bridge 22 may be pulled close to each other. Then, the radius of curvature of the first elastic bridge 21 and the radius of curvature of the second elastic bridge 22 are reduced because of the contraction force of the variable length element 23. Therefore, the movable frame 12 may be forced to move away from the fixed frame 11.

In this case, the free ends of the pair of side frames 13a are driven away from each other. To this end, the pair of side frames 13a may include a bimetal element or a piezoelectric element that is bendable or extendable by temperature control or electrical control. For example, the pair of side frames 13a may be bent in a curved shape when a driving voltage is applied thereto, and may stretch in a straight shape when the driving voltage is not applied thereto. In this case, while the distance between the fixed frame 11 and the movable frame 12 is changed, the driving device 120 may apply a driving voltage to the pair of side frames 13a under the control of the processor 140 to bend the pair of side frames 13a such that the free ends of the pair of side frames 13a which face each other may be moved away from each other as shown in FIG. 2B. Then, the movable frame 12 is moved away from the fixed frame 11 while being pushed by the second elastic bridge 22.

Thereafter, when the movable frame 12 passes by the positions of the second protrusions 13c, the driving device 120 stops applying the driving voltage to the variable length element 23 and the driving voltage to the pair of side frames 13a under the control of the processor 140. As a result, the pair of side frames 13a stretch in a straight shape, and the free ends of the pair of side frames 13a become close to each other. In addition, due to the elastic restoring force of the first elastic bridge 21 and the second elastic bridge 22, the movable frame 12 may be forced to move toward to the fixed frame 11. Therefore, both sides of the movable frame 12 are brought into contact with the second protrusions 13c and are not further moved toward the fixed frame 11 because of the second protrusions 13c, such that the position of the movable frame 12 is fixed. Then, as shown in FIG. 2B, the image forming device 110 fixed to the movable frame 12 is fixed at a position closer to the combiner member 130 than the position as shown in FIG. 2A.

When the image forming device 110 is moved from the position shown in FIG. 2B back to the position shown in FIG. 2A, the driving device 120 applies a driving voltage only to the pair of side frames 13a under the control of the processor 140. Then, as the pair of side frames 13a are bent, the free ends of the pair of side frames 13a are moved away from each other. At this time, because of the elastic restoring force of the first elastic bridge 21 and the second elastic bridge 22, the movable frame 12 may be forced to move toward to the fixed frame 11. Then, when the movable frame 12 passes by the positions of the second protrusions 13c, the driving device 120 stops applying the driving voltage to the pair of side frames 13a. As a result, both side surfaces of the movable frame 12 are caught by the first protrusions 13b as the pair of side frames 13a stretch in a straight shape.

As described above, the pair of side frames 13a are operated in such a manner that the pair of side frames 13a are in a bent state having a curved shape while the distance between the fixed frame 11 and the movable frame 12 is changed and are in a straight state while the distance between the fixed frame 11 and the movable frame 12 is maintained. Therefore, while the distance between the fixed frame 11 and the movable frame 12 is changed, the mutually-facing free ends of the pair of side frames 13a are moved away from each other, and thus the movable frame 12 is allowed to move. While the distance between the fixed frame 11 and the movable frame 12 is maintained, the mutually-facing free ends of the pair of side frames 13a become closer to each other than in the bent state, and thus the fixed frame 11 is caught by the first protrusions 13b or the second protrusions 13c and may not move.

In addition, when the image forming device 110 is moved from the position shown in FIG. 2A to the position shown in FIG. 2B, driving voltage is applied to both the variable length element 23 and the pair of side frames 13a. When the image forming device 110 is moved from the position shown in FIG. 2B to the position shown in FIG. 2A, driving voltage is applied to only the pair of side frames 13a. In addition, while the image forming device 110 is fixed at the position shown in FIG. 2A or the position shown in FIG. 2B, no voltage is applied to both the variable length element 23 and the pair of side frames 13a.

Therefore, in the display apparatus 100 of the example embodiment, power is consumed only while the position of the image forming device 110 is changed to change the depth of an image that the viewer views. While the depth of an image is maintained, since the position of the image forming device 110 is fixed using the fixing member 30, power is not consumed. Therefore, according to the example embodiment, power consumption of the display apparatus 100 may be reduced while the depth of an image is maintained.

Figure 3A:
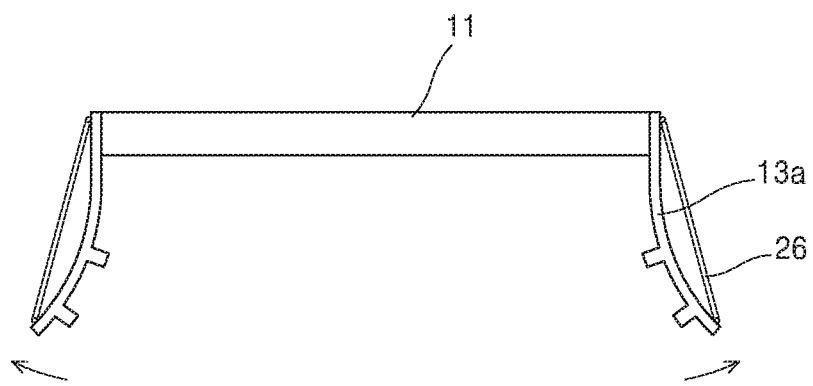
FIGS. 3A and 3B are views schematically illustrating a structure and operation of a fixing member according to another example embodiment.
Figure 3B:
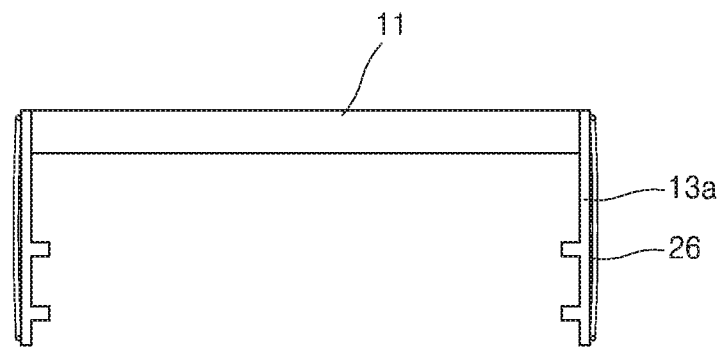

Meanwhile, the pair of side frames 13a are not limited to bimetal elements or piezoelectric elements. For example, FIGS. 3A and 3B are views schematically illustrating a structure and operation of the fixing member 30 according to another example embodiment. Referring to FIGS. 3A and 3B, the fixing member 30 may further include variable length elements 26 fixed between the free ends and the fixed ends of the pair of side frames 13a. In this case, each of the pair of side frames 13a may include a plate-like material having elastic restoring force such as a metal or a plastic. For example, each of the pair of side frames 13a may have elastic restoring force in a stretching direction thereof. For example, the pair of side frames 13a may have elastic restoring force in directions in which the mutually-facing free ends of the pair of side frames 13a approach each other.

While the distance between the fixed frame 11 and the movable frame 12 is changed, the driving device 120 applies a driving voltage to the variable length elements 26 under the control of the processor 140 to contract the variable length elements 26 as shown in FIG. 3A. Then, the free ends of the pair of side frames 13a are moved away from each other while being bent. While the distance between the fixed frame 11 and the movable frame 12 is maintained, the driving voltage is not applied to the variable length elements 26 as shown in FIG. 3B. Then, the lengths of the variable length elements 26 increases, and the pair of side frames 13a become straight due to the elastic restoring force thereof. Therefore, the free ends of the pair of side frames 13a become closer to each other than when they are bent.

Figure 4A:
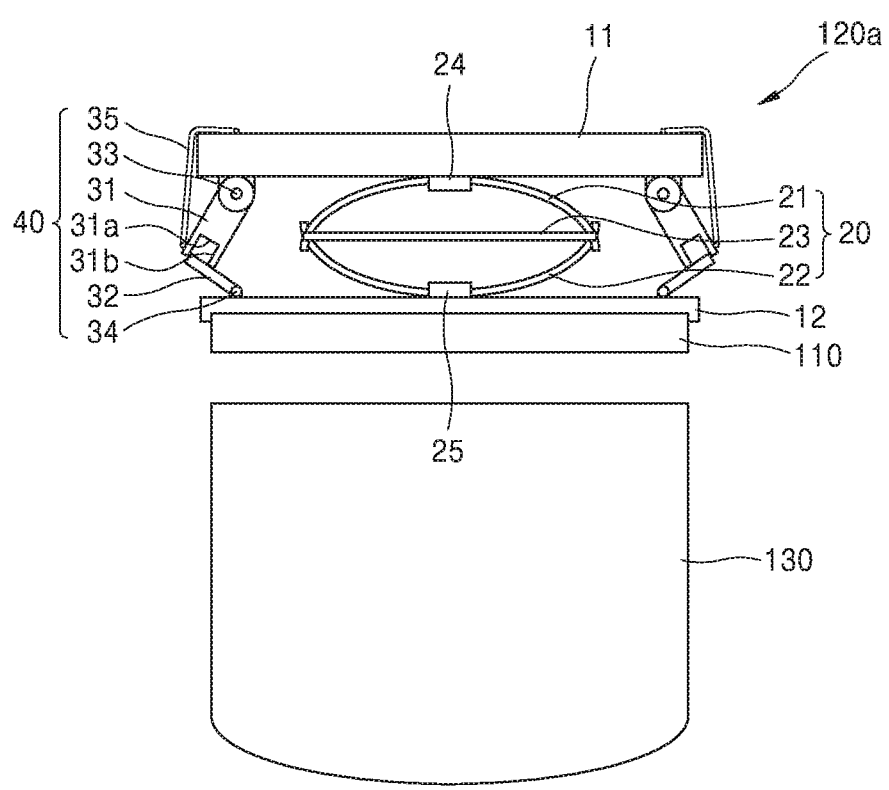
FIGS. 4A and 4B are views schematically illustrating a structure and operation of a driving device according to another example embodiment.
Figure 4B:
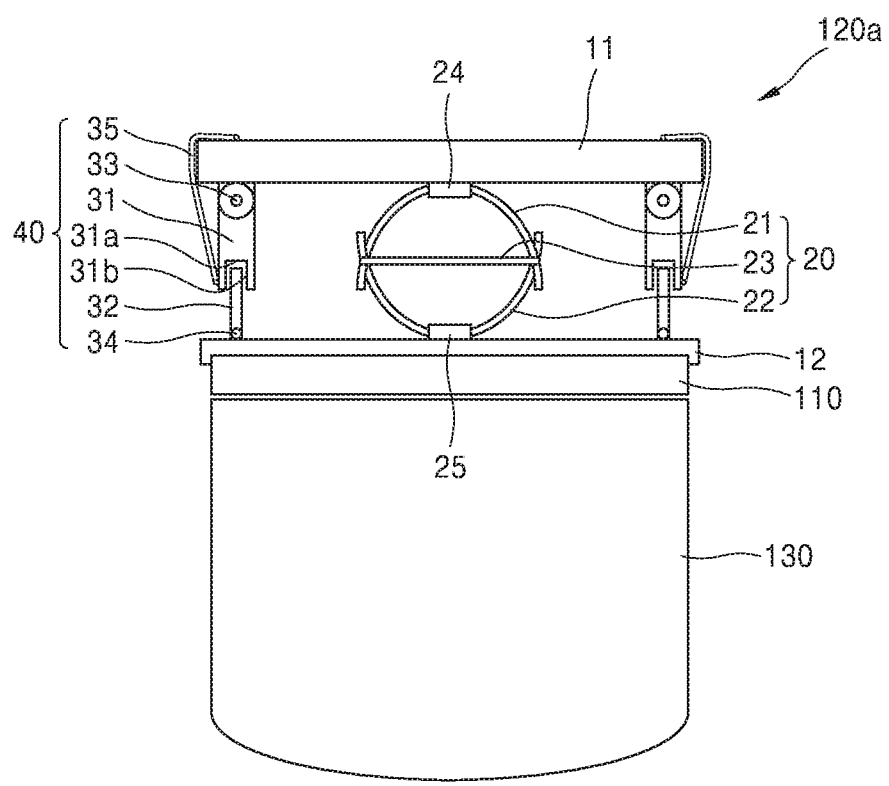

FIGS. 4A and 4B are views schematically illustrating a structure and operation of a driving device 120a according to another example embodiment. Referring to FIGS. 4A and 4B, the driving device 120a may include a fixed frame 11 which is fixed to the inside of the display apparatus 100, a movable frame 12 which is arranged to face the fixed frame 11 and is movable; an actuator 20 which is configured to change the distance between the fixed frame 11 and the movable frame 12, and a fixing member 40 which is configured to fix the distance between the fixed frame 11 and the movable frame 12. The driving device 120a shown in FIGS. 4A and 4B is different from the driving device 120 shown in FIGS. 2A and 2B in terms of the structure of the fixing member 40.

The fixing member 40 may include a pair of first rods 31 rotatably arranged at both side edges of the fixed frame 11, and a pair of second rods 32 rotatably arranged at both side edges of the movable frame 12. For example, the pair of first rods 31 may be rotatably fixed to a lower surface of the fixed frame 11 via hinges 33, and the pair of second rods 32 may be rotatably fixed to an upper surface of the movable frame 12 via hinges 34.

To adjust the distance between the fixed frame 11 and the movable frame 12, end portions of the pair of first rods 31 and corresponding end portions of the pair of second rods 32 may be configured to make contact with each other and interfere with each other. For example, the end portions of the pair of first rods 31 may include recesses 31*a* and barriers 31*b* surrounding the recesses 31*a*. In addition, the end portions of the pair of second rods 32 may be placed in the recesses 31*a* of the pair of first rods 31 which correspond thereto. The widths of the end portions of the pair of second rods 32 may be respectively less than the widths of the recesses 31*a* of the pair of first rods 31 which correspond thereto, such that the end portions of the pair of second rods 32 may move within predetermined ranges inside the recesses 31*a*. That is, in the recesses 31*a*, there may be predetermined gaps between the end portions of the pair of second rods 32 and the barriers 31*b*. The recesses 31*a* and the end portions of the pair of second rods 32 may have a straight shape, but are not limited thereto and may have, for example, a circular shape or polygonal shape. For example, the recesses 31*a* may be provided in the form of circular hollow cylinders or polygonal hollow cylinders, and the end portions of the pair of second rods 32 may be provided in the form of cylindrical or polygonal solid cylinders.

In FIGS. 4A and 4B, the recesses 31*a* and the barriers 31*b* are formed at the pair of first rods 31, but embodiments are not limited thereto. In another example embodiment, the recesses 31*a* and the barriers 31*b* may be formed at the pair of second rods 32 instead of being formed at the pair of first rods 31.

The fixing member 40 may have a first state in which the pair of first rods 31 and the pair of second rods 32 corresponding the pair of first rods 31 are fixed in a straight line with each other, and a second state in which the pair of first rods 31 and the pair of second rods 32 corresponding to the pair of first rods 31 are fixed in at an inclined angle with respect to each other. In the first state, the end portions of the pair of second rods 32 come into contact with bottom surfaces of the recesses 31*a* of the pair of first rods 31 corresponding thereto, and the pair of first rods 31 and the pair of second rods 32 are restrained from moving further. Furthermore, in the second state, the end portions of the pair of second rods 32 come into contact with inner walls of the barriers 31*b* of the pair of first rods 31 corresponding thereto, and at the same time, portions of the barriers 31*b* of the pair of first rods 31 come into contact with side walls of the pair of second rods 32 corresponding thereto, such that the pair of first rods 31 and the pair of second rods 32 may be restrained from moving further.

As shown in FIG. 4A, the fixing member 40 is initially in the second state in which the pair of first rods 31 and the pair of second rods 32 corresponding to the pair of first rods 31 are fixed at an inclined angle with respect to each other. In the second state, the movable frame 12 is closer to the fixed frame 11. Therefore, the image forming device 110 fixed to a lower surface of the movable frame 12 is distant from the light entrance surface of the combiner member 130. Although the movable frame 12 may be forced to move toward the fixed frame 11 because of the elastic restoring force of a first elastic bridge 21 and a second elastic bridge 22, the position of the movable frame 12 may be fixed because the end portions of the pair of second rods 32 are in contact with the inner walls of the barriers of the pair of first rods 31, and thus are restrained from moving.

When the driving device 120*a* applies a driving voltage to the variable length element 23 under the control of the processor 140, the variable length element 23 contracts such that both ends of the first elastic bridge 21 may be pulled close to each other and both ends of the second elastic bridge 22 may be pulled close to each other. Then, the radius of curvature of the first elastic bridge 21 and the radius of curvature of the second elastic bridge 22 are reduced because of the contraction force of the variable length element 23. Therefore, the movable frame 12 may be forced to move away from the fixed frame 11.

Then, as shown in FIG. 4B, the fixing member 40 enters into the second state in which the pair of first rods 31 and the pair of second rods 32 corresponding to the pair of first rods 31 are fixed in a straight line with each other. In the first state, the movable frame 12 is farther away from the fixed frame 11 than the second state. Therefore, the image forming device 110 fixed to the lower surface of the movable frame 12 is closer to the light entrance surface of the combiner member 130.

After the pair of first rods 31 and the pair of second rods 32 corresponding to the pair of first rods 31 are completely arranged in a straight line with each other, the driving device 120*a* may stop applying the driving voltage to the variable length element 23. Then, the movable frame 12 may be forced toward the fixed frame 11 by the elastic restoring force of the first elastic bridge 21 and the second elastic bridge 22. However, since the end portions of the pair of second rods 32 are in contact with the bottom surfaces of the recesses 31*a* of the pair of first rods 31, and thus are restrained from moving, the position of the movable frame 12 may be fixed.

In addition, the fixing member 30 may further include variable length elements 35 respectively connected between both side edges of the fixed frame 11 and the end portions of the pair of first rods 31. For example, the variable length elements 35 may be connected between an upper surface of the fixed frame 11 and outer walls of the barriers 31*b* of the pair of first rods 31. When a driving voltage is applied to the variable length elements 35, the variable length elements 35 may contract. Therefore, the pair of first rods 31 may rotate in outward directions of both sides of the fixed frame 11 as the end portions of the pair of first rods 31 are pulled.

When the image forming device 110 is moved from the position shown in FIG. 4B to the position shown in FIG. 4A, the driving device 120*a* applies a driving voltage to the variable length elements 35 under the control of the processor 140. Then, as the variable length elements 35 contract, the pair of first rods 31 rotate in the outward directions of both sides of the fixed frame 11. In addition, as the pair of first rods 31 rotate, the pair of second rods 32 also rotate in the outward directions of both sides of the fixed frame 11. When the pair of first rods 31 and the pair of second rods 32 rotate by a predetermined angle, the end portions of the pair of second rods 32 come into contact with the inner walls of the barriers 31*b* of the pair of first rods 31 corresponding thereto, and at the same time, portions of the barriers 31*b* of the pair of first rods 31 come into contact with the sides of the pair of second rods 32 corresponding thereto. Therefore, the pair of first rods 31 and the pair of second rods 32 are restrained from moving such that the movable frame 12 may be fixed.

As described above, when the fixing member 40 changes from the second state to the first state, the distance between the fixed frame 11 and the movable frame 12 increases. In this case, the image forming device 110 moves closer to the light entrance surface of the combiner member 130. Driving voltage is applied only to the actuator 20 while the fixing member 40 is changed from the second state to the first state. When the fixing member 40 changes from the first state to the second state, the distance between the fixed frame 11 and the movable frame 12 decreases. In this case, the image forming device 110 is farther away from the light entrance surface of the combiner member 130 than in the first state.

Driving voltage is applied only to the variable length elements 35 while the fixing member 40 is changed from the second state to the first state. In addition, power is not consumed while the distance between the fixed frame 11 and the movable frame 12 is maintained.

Figure 5A:
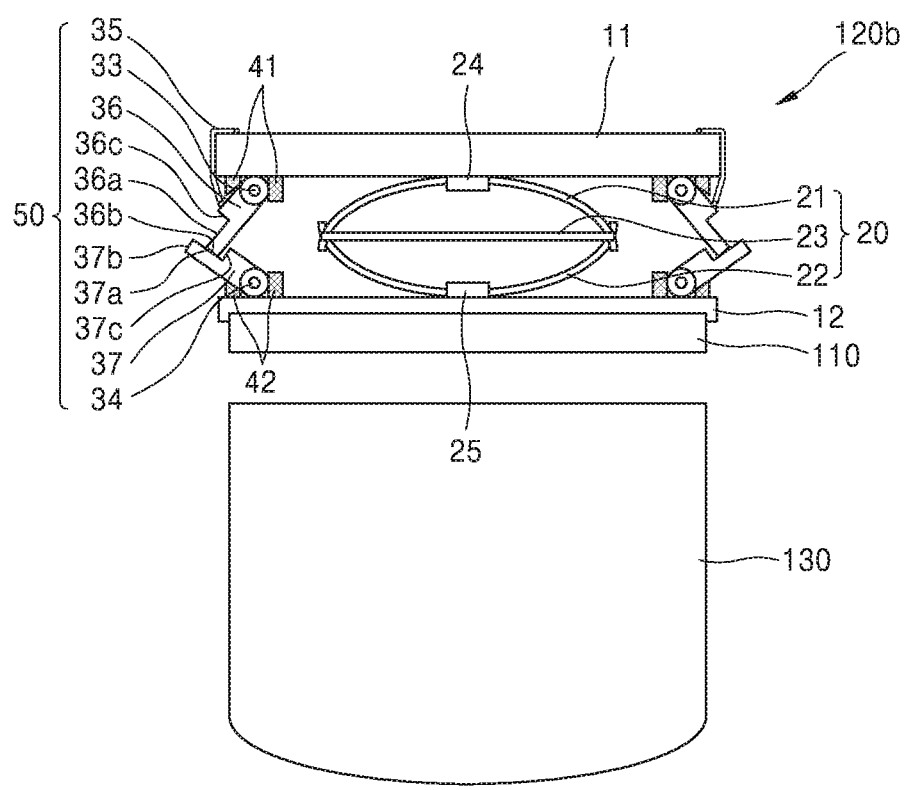
FIGS. 5A and 5B are views schematically illustrating a structure and operation of a driving device according to another example embodiment.
Figure 5B:
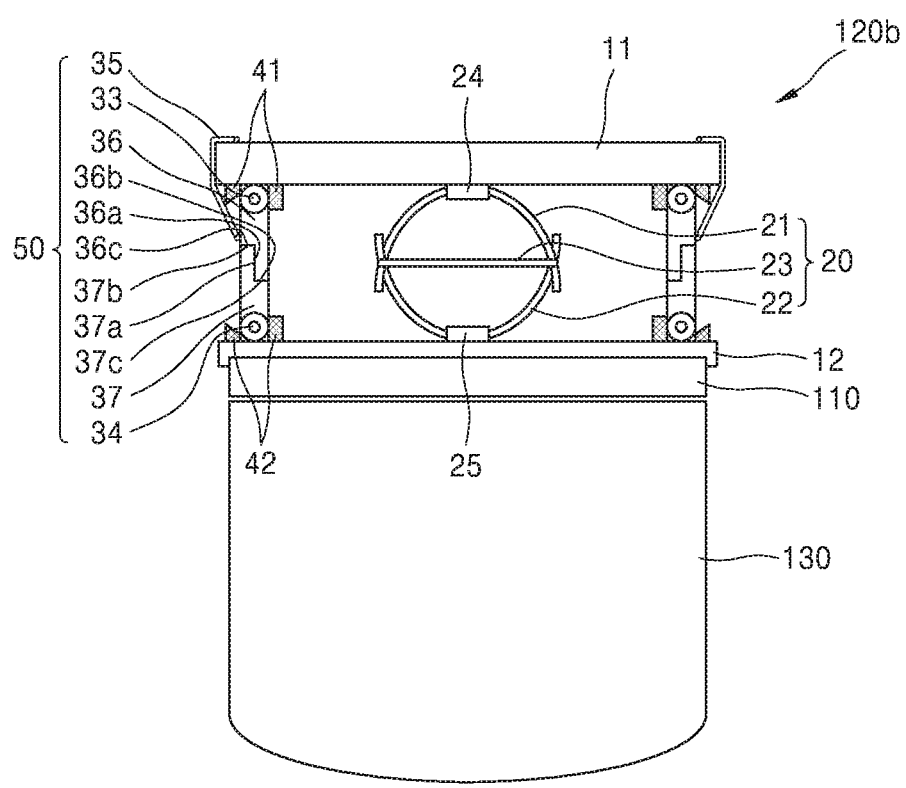

FIGS. 5A and 5b are views schematically illustrating a structure and operation of a driving device 120b according to another example embodiment. The structure of the driving device 120b shown in FIGS. 5A and 5B is similar to the structure of the driving device 120a shown in FIGS. 4A and 4B except for the structure of a fixing member 50.

Referring to FIGS. 5A and 5B, the fixing member 50 may include a pair of first rods 36 rotatably arranged at both side edges of a fixed frame 11, and a pair of second rods 37 rotatably arranged at both side edges of a movable frame 12. For example, the pair of first rods 36 may be rotatably fixed to a lower surface of the fixed frame 11 via hinges 33, and the pair of second rods 37 may be rotatably fixed to an upper surface of the movable frame 12 via hinges 34. End portions of the pair of first rods 36 and end portions of the pair of second rods 37 corresponding thereto may have complementary shapes to engage with each other. For example, the end portions of the pair of first rods 36 may have a stepped shape, and the end portions of the pair of second rods 37 corresponding thereto may have a stepped shape complementary to the stepped shape of the end portions of the pair of first rods 36.

The fixing member 50 may have a first state in which the pair of first rods 36 and the pair of second rods 37 corresponding the pair of first rods 36 are fixed in a straight line with each other, and a second state in which the pair of first rods 36 and the pair of second rods 37 corresponding to the pair of first rods 36 are fixed at an inclined angle with respect to each other. In the first state, the end portions of the pair of first rods 36 engage with the end portions of the pair of second rods 37 corresponding thereto such that the pair of first rods 36 and the pair of second rods 37 are restrained from moving further. In this case, lateral surfaces 36a of the end portions of the pair of first rods 36 are in parallel with and in tight contact with lateral surfaces 37a of the end portions of the pair of second rods 37 corresponding thereto. In addition, end surfaces 36b of the end portions of the pair of first rods 36 are in contact with stop surfaces 37c of the end portions of the pair of second rods 37 corresponding thereto, and end surfaces 37b of the end portions of the pair of second rods 37 are in contact with stop surfaces 36c of the end portions of the pair of first rods 36 corresponding thereto. In the second state, the end surfaces 36b of the end portions of the pair of first rods 36 are in contact with the lateral surfaces 37a of the end portions of the pair of second rods 37 corresponding thereto, and thus the pair of first rods 36 and the pair of second rods 37 are restrained from moving further.

In addition, the fixing member 50 may include first stoppers 41 arranged on the lower surface of the fixed frame 11 to limit the rotation angles of the pair of first rods 36, and second stoppers 42 arranged on the upper surface of the movable frame 12 to limit the rotation angles of the pair of second rods 37. The first stoppers 41 protrude from the lower surface of the fixed frame 11 around the hinges 33 of the pair of first rods 36. Therefore, the rotations of the pair of first rods 36 are limited when the pair of first rods 36 come into contact the first stoppers 41 while the rotation angles of the pair of first rods 36 increase. The second stoppers 42 protrude from the upper surface of the movable frame 12 around the hinges 34 of the pair of second rods 37. Therefore, the rotations of the pair of second rods 37 are limited when the pair of second rods 37 come into contact with the second stoppers 42 while the rotation angles of the pair of second rods 37 increase. The first and second stoppers 41 and 42 may also be applied to the example embodiment shown in FIGS. 4A and 4B.

In addition, the fixing member 50 may further include variable length elements 35 respectively connected between both side edges of the fixed frame 11 and the end portions of the pair of first rods 36. The variable length elements 35 are contracted by electrical control to switch the fixing member 50 from the first state to the second state.

The operation of the driving device 120b shown in FIGS. 5A and 5B is similar to the operation of the driving device 120a shown in FIGS. 4A and 4B. As shown in FIG. 5A, the fixing member 50 is initially in the second state in which the pair of first rods 36 and the pair of second rods 37 corresponding to the pair of first rods 36 are fixed at an inclined angle with respect to each other. In the second state, the image forming device 110 fixed to a lower surface of the movable frame 12 is farther away from the light entrance surface of the combiner member 130 than the first state. Although the movable frame 12 may be forced to move toward the fixed frame 11 by the elastic restoring force of a first elastic bridge 21 and a second elastic bridge 22, the pair of first rods 36 and the pair of second rods 37 are restrained from moving further because the end surfaces 37b of the end portions of the pair of second rods 37 are in contact with the lateral surfaces 36a of the end portions of the pair of first rods 36 corresponding thereto, the pair of first rods 36 are in contact with the first stoppers 41, and the pair of second rods 37 are in contact with the second stoppers 42. Thus, the position of the movable frame 12 may be fixed.

When the depth of an image displayed on the image forming device 110 changes, the processor 140 controls the driving device 120b to apply a driving voltage to a variable length element 23. Then, since the variable length element 23 is contracted to further bend the first elastic bridge 21 and the second elastic bridge 22, the movable frame 12 may be forced to move in a direction away from the fixed frame 11. As a result, as shown in FIG. 5B, the fixing member 50 enters into the first state in which the pair of first rods 36 and the pair of second rods 37 corresponding to the pair of first rods 36 are fixed in a straight line with each other. At this time, the end portions of the pair of first rods 36 and the end portions of the pair of second rods 37 engage with each other, and thus the pair of first rods 36 and the pair of second rods 37 are restrained from moving further. Thus, the position of the movable frame 12 may be fixed.

When the image forming device 110 is moved from the position shown in FIG. 5B to the position shown in FIG. 5A, the driving device 120b applies a driving voltage to the variable length elements 35 under the control of the processor 140. Then, as the variable length elements 35 contract, the pair of first rods 36 rotate in outward directions of both sides of the fixed frame 11. In addition, as the pair of second rods 37 are pushed by the pair of first rods 36, the pair of second rods 37 are also rotated in the outward directions of both sides of the fixed frame 11. When the pair of first rods 36 and the pair of second rods 37 rotate by a predetermined angle, the end surfaces 36b of the end portions of the pair of first rods 36 come into contact with the lateral surfaces 37a of the end portions of the pair of second rods 37 corresponding thereto, and thus the pair of first rods 36 and the pair of second rods 37 are restrained from moving further.

Figure 6A:
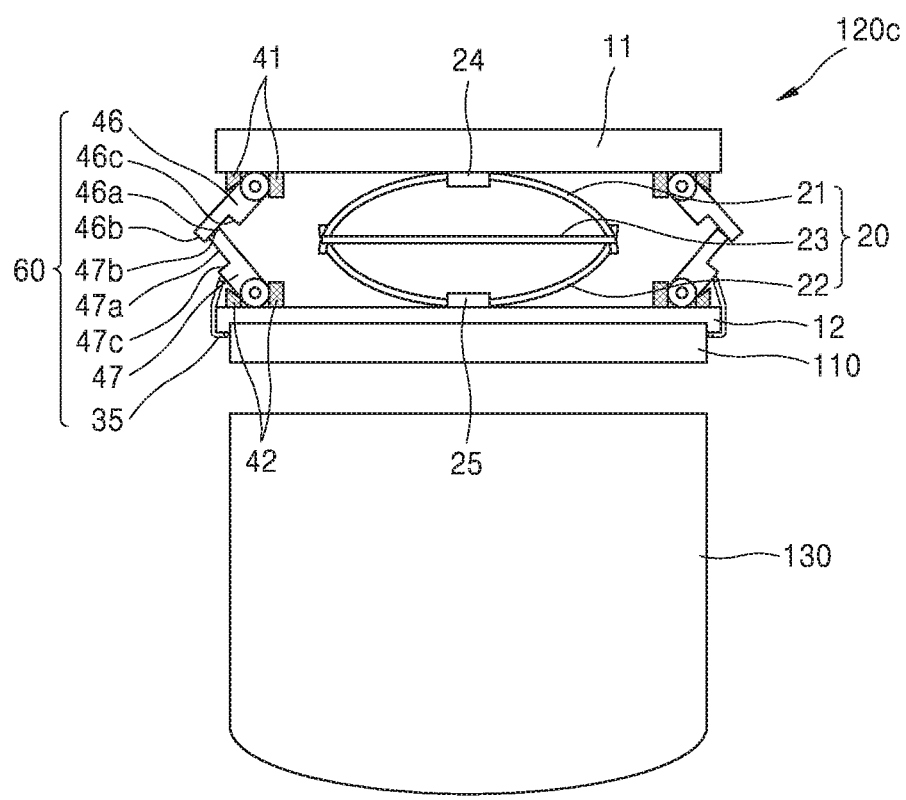
FIGS. 6A and 6B are views schematically illustrating a structure and operation of a driving device according to another example embodiment.
Figure 6B:
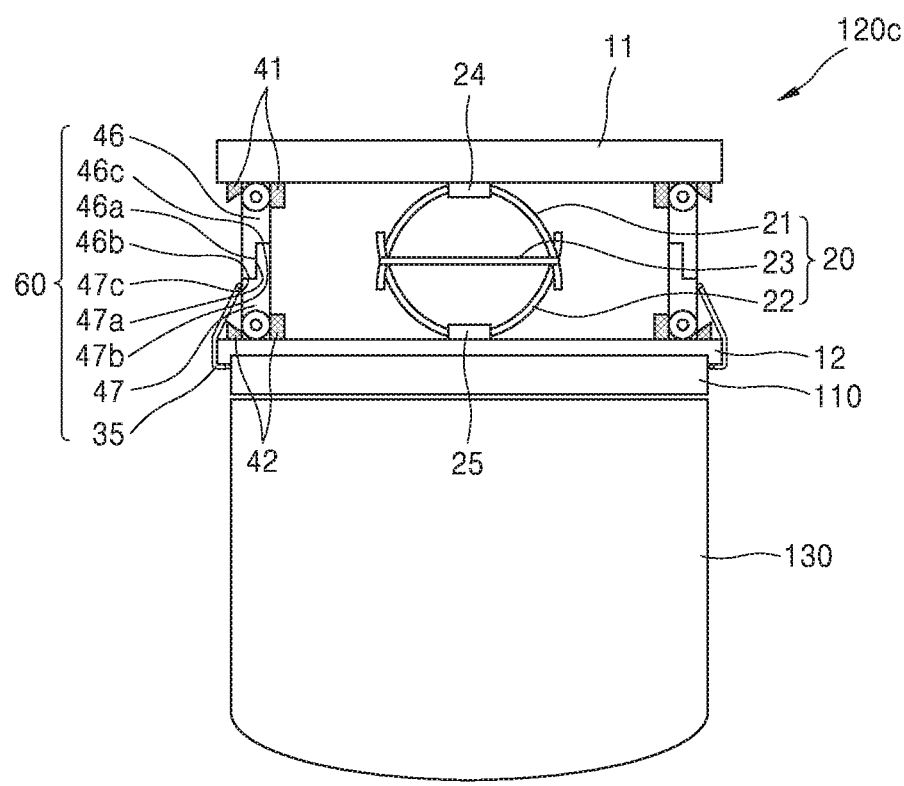

FIGS. 6A and 6b are views schematically illustrating a structure and operation of a driving device 120c according to another example embodiment. The structure of the driving device 120c shown in FIGS. 6A and 6B is similar to the structure of the driving device 120b shown in FIGS. 5A and 5B except for the structure of a fixing member 60. Referring to FIGS. 6A and 6B, the fixing member 60 may include a pair of first rods 46 that are rotatable and arranged at both side edges of a fixed frame 11, and a pair of second rods 47 that are rotatable and arranged at both side edges of a movable frame 12. End portions of the pair of first rods 46 and end portions of the pair of second rods 47 corresponding thereto may have complementary shapes to engage with each other. For example, the end portions of the pair of first rods 46 may have a stepped shape, and the end portions of the pair of second rods 47 corresponding thereto may have a stepped shape complementary to the stepped shape of the end portions of the pair of first rods 46.

The pair of first rods 46 and the pair of second rods 47 shown in FIGS. 6A and 6B have left-right reversed shapes compared to the pair of first rods 36 and the pair of second rods 37 shown in FIGS. 5A and 5B. Thus, in a second state in which the pair of first rods 46 and the pair of second rods 47 corresponding thereto are fixed at an inclined angle to each other, end surfaces 47b of the end portions of the pair of second rods 47 are in contact with lateral surfaces 46a of the end portions of the pair of first rods 46 corresponding thereto.

In addition, the fixing member 60 may further include variable length elements 35 respectively connected between both side edges of the movable frame 12 and the end portions of the pair of second rods 47. When the fixing member 60 changes from a first state to the second state, the variable length elements 35 contract, and thus the pair of second rods 47 are rotated in outward directions of both sides of the movable frame 12. In addition, as the pair of first rods 46 are pushed by the pair of second rods 47, the pair of first rods 46 are also rotated in the outward directions of both sides of the movable frame 12.

Figure 7A:
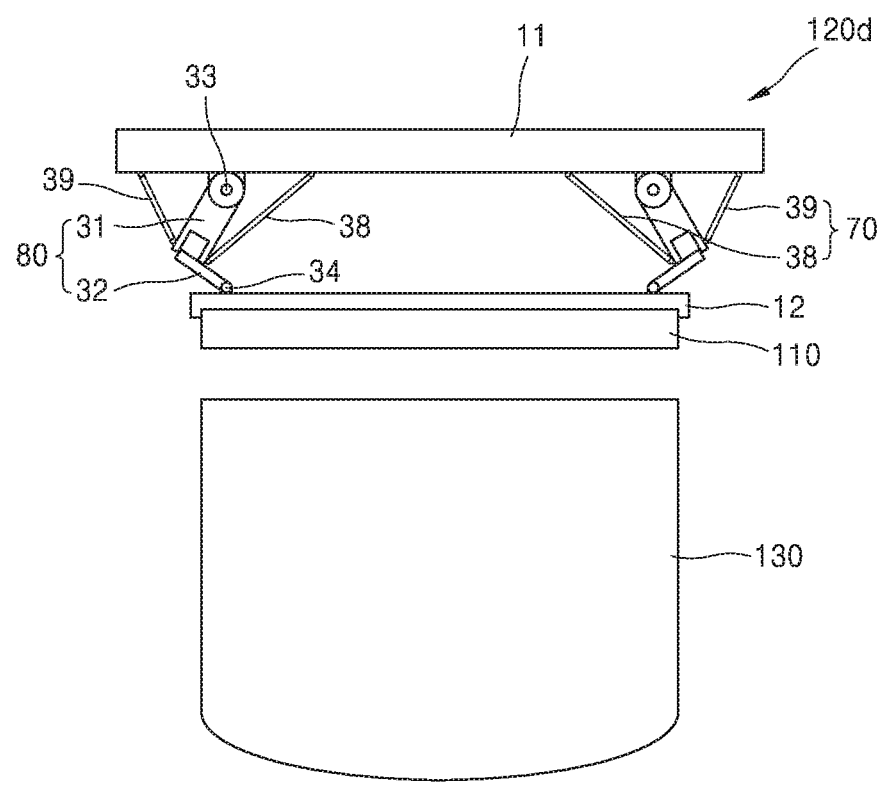
FIGS. 7A and 7B are views schematically illustrating a structure and operation of a driving device according to another example embodiment.
Figure 7B:
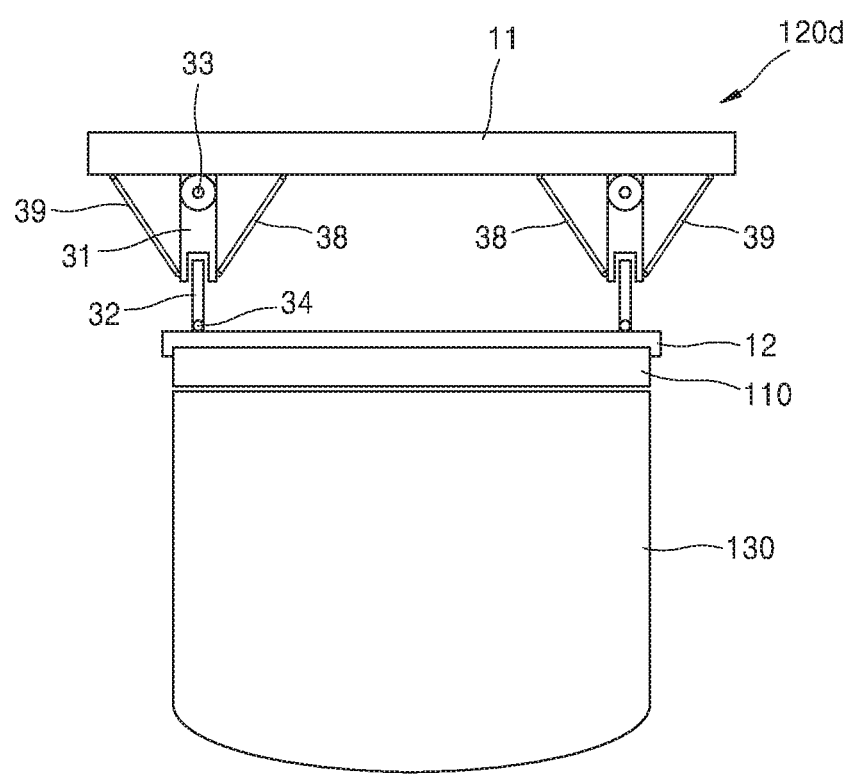

FIGS. 7A and 7B are views schematically illustrating a structure and operation of a driving device 120d according to another example embodiment. Referring to FIGS. 7A and 7B, the driving device 120d may include a fixed frame 11 which is fixed to the inside of the display apparatus 100, a movable frame 12 which is arranged to face the fixed frame 11 and is movable, an actuator 70 which is configured to change the distance between the fixed frame 11 and the movable frame 12, and a fixing member 80 which is configured to fix the distance between the fixed frame 11 and the movable frame 12.

The fixing member 80 may include a pair of first rods 31 rotatably arranged at both side edges of the fixed frame 11, and a pair of second rods 32 rotatably arranged at both side edges of the movable frame 12. End portions of the pair of first rods 31 and end portions of the pair of second rods 32 corresponding thereto may be configured to make contact with each other and interfere with each other. In FIGS. 7A and 7B, the fixing member 80 is illustrated as including the same pairs of first and second rods 31 and 32 as those shown in FIGS. 4A and 4B, but is not limited thereto. The fixing member 80 may include the pair of first rods 36 and the pair of second rods 37 which are shown in FIGS. 5A and 5B, or the pair of first rods 46 and the pair of second rods 47 which are shown in FIGS. 6A and 6B.

The actuator 70 may include first variable length elements 38 connected between the fixed frame 11 and inner lateral surfaces of the pair of first rods 31, and second variable length elements 39 connected between the fixed frame 11 and outer lateral surfaces of the pair of first rods 31. A length of the first variable length elements 38 and a length of the second variable length elements 39 may change by electrical control. For example, when a driving voltage is applied to the first variable length elements 38 and the second variable length elements 39, the first variable length elements 38 and the second variable length elements 39 may contract and decrease in length. The first variable length elements 38 and the second variable length elements 39 may be connected to opposite lateral surfaces of the end portions of the pair of first rods 31. For example, the first variable length elements 38 may be connected between the inner lateral surfaces of the pair of first rods 31 and near-center portions of a lower surface of the fixed frame 11. In addition, the second variable length elements 39 may be connected between the outer lateral surfaces of the pair of first rods 31 and near-edge portions of the lower surface of the fixed frame 11.

The fixing member 80 may have a first state in which the pair of first rods 31 and the pair of second rods 32 corresponding to the pair of first rods 31 are fixed in a straight line with each other, and a second state in which the pair of first rods 31 and the pair of second rods 32 corresponding to the pair of first rods 31 are fixed at an inclined angle with respect to each other. When the distance between the fixed frame 11 and the movable frame 12 is decreased, the first variable length elements 38 may be elongated and the second variable length elements 39 may be shortened as shown in FIG. 7A such that the fixing member 80 may be switched from the first state to the second state. To this end, the driving device 120d may apply a driving voltage to the second variable length elements 39 under the control of the processor 140. After the fixing member 80 is switched to the second state, application of the driving voltage to the second variable length elements 39 may be stopped.

In addition, when the distance between the fixed frame 11 and the movable frame 12 is increased, the first variable length elements 38 may be shortened and the second variable length elements 39 may be elongated such that the fixing member 80 may be switched from the second state to the first state. To this end, the driving device 120d may apply a driving voltage to the first variable length elements 38 under the control of the processor 140. After the fixing member 80 is switched to the first state, application of the driving voltage to the first variable length elements 38 may be stopped.

Figure 8A:
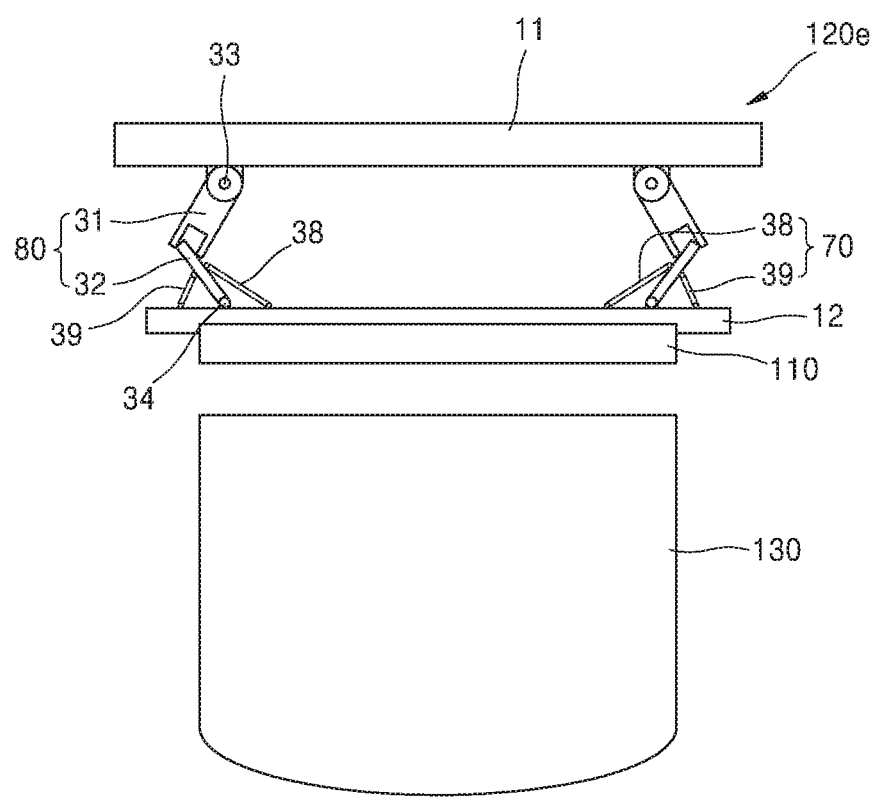
FIGS. 8A and 8B are views schematically illustrating a structure and operation of a driving device according to another example embodiment.
Figure 8B:
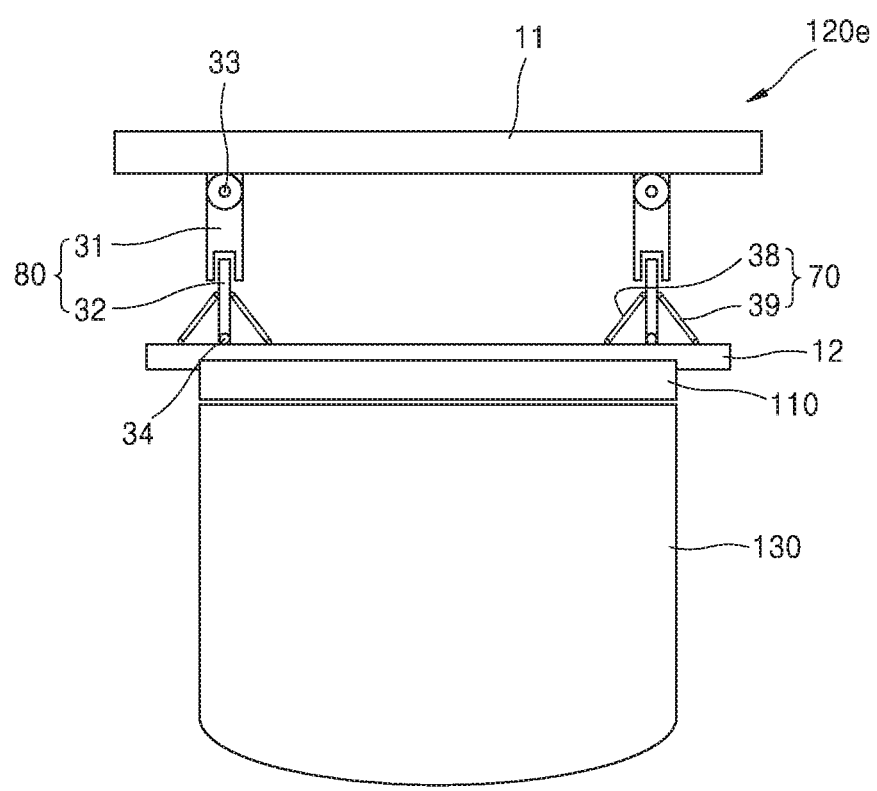

FIGS. 8A and 8B are views schematically illustrating a structure and operation of a driving device 120e according to another example embodiment. In FIGS. 7A and 7B, the first variable length elements 38 and the second variable length elements 39 are illustrated as being connected between the fixed frame 11 and the pair of first rods 31. However, embodiments are not limited thereto. As shown in FIGS. 8A and 8B, first variable length elements 38 may be connected between near-center portions of an upper surface of the movable frame 12 and inner lateral surfaces of the pair of second rods 32. In addition, second variable length elements 39 may be connected between near-edge portions of the upper surface of the movable frame 12 and outer lateral surfaces of the pair of second rods 32. Apart from the configurations of the first variable length element 38 and the second variable length element 39, the driving device 120e shown in FIGS. 8A and 8B having the same structure and operation as the driving device 120d shown in FIGS. 7A and 7B.

Figure 9:
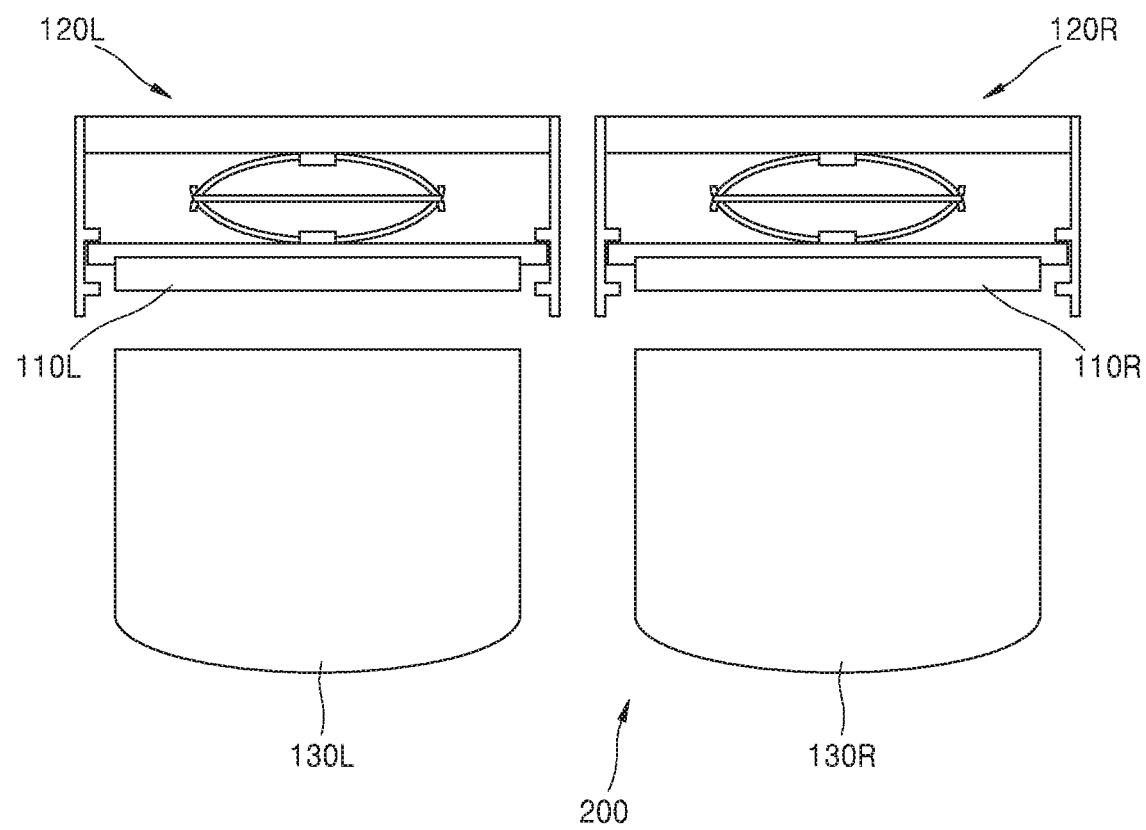
FIG. 9 is a view schematically illustrating a structure of a display apparatus according to another example embodiment.

The display apparatus 100 described above may provide images to only one eye of a viewer. However, display apparatus may be configured to provide images to both eyes of a viewer. For example, FIG. 9 schematically illustrates a structure of a display apparatus 200 according to another example embodiment. Referring to FIG. 9, the display apparatus 200 of the example embodiment may include a left-eye image forming device 110L configured to form left-eye images, a left-eye combiner member 130L configured to provide the left-eye images to a viewer together with light containing and propagating from an outside landscape, a left-eye driving device 120L configured to adjust the distance between the left-eye image forming device 110L and the left-eye combiner member 130L, a right-eye image forming device 110R configured to form right-eye images, a right-eye combiner member 130R configured to provide the right-eye images to the viewer together with light containing and propagating from the outside landscape, and a right-eye driving device 120R configured to adjust the distance between the right-eye image forming device 110R and the right-eye combiner member 130R.

Figure 10:
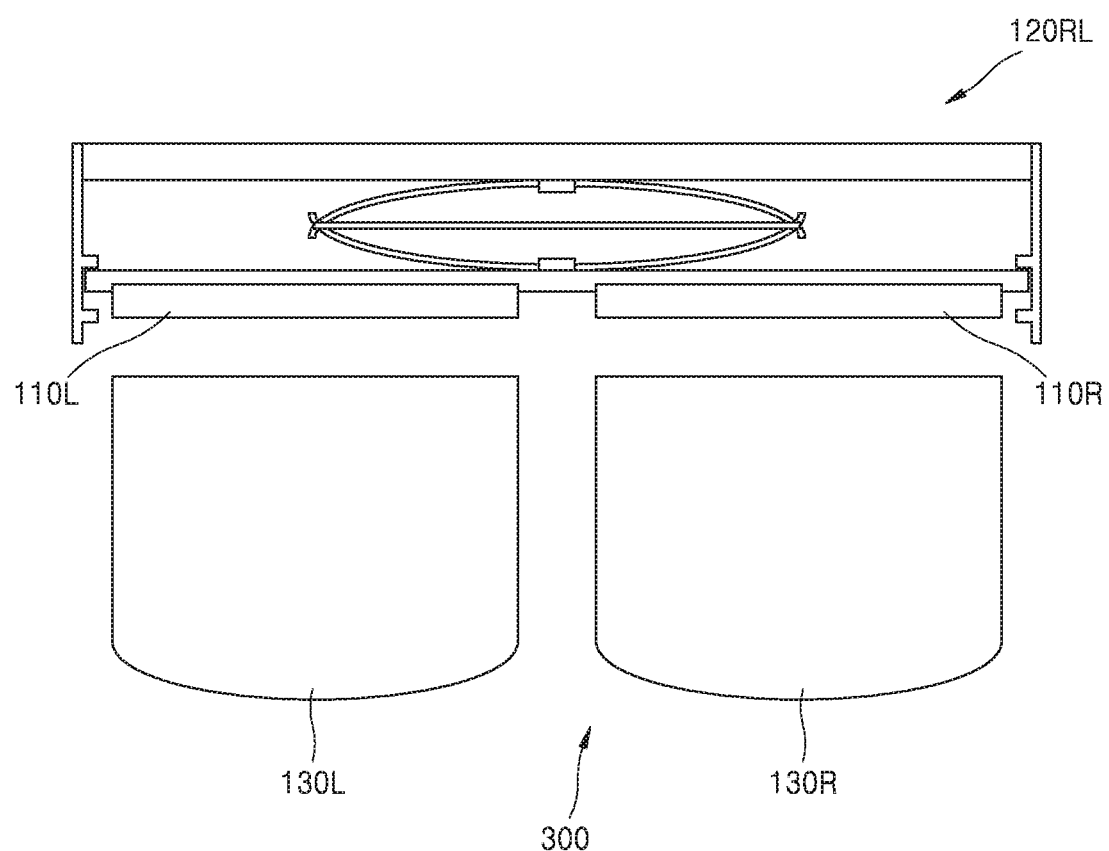
FIG. 10 is a view schematically illustrating a structure of a display apparatus according to another example embodiment.

In addition, FIG. 10 schematically illustrates a structure of a display apparatus 300 according to another example embodiment. Referring to FIG. 10, the display apparatus 300 of the example embodiment may include a left-eye image forming device 110L configured to form left-eye images, a left-eye combiner member 130L configured to provide the left-eye images to a viewer together with light containing and propagating from an outside landscape, a right-eye image forming device 110R configured to form right-eye images, a right-eye combiner member 130R configured to provide the right-eye images to the viewer together with light containing and propagating from the outside landscape, and a driving device 120RL configured to adjust the positions of the left-eye image forming device 110L and the right-eye image forming device 110R. The driving device 120RL may simultaneously adjust the distance between the right-eye image forming device 110R and the right-eye combiner member 130R and the distance between the left-eye image forming device 110L and the left-eye combiner member 130L.

Figure 11:
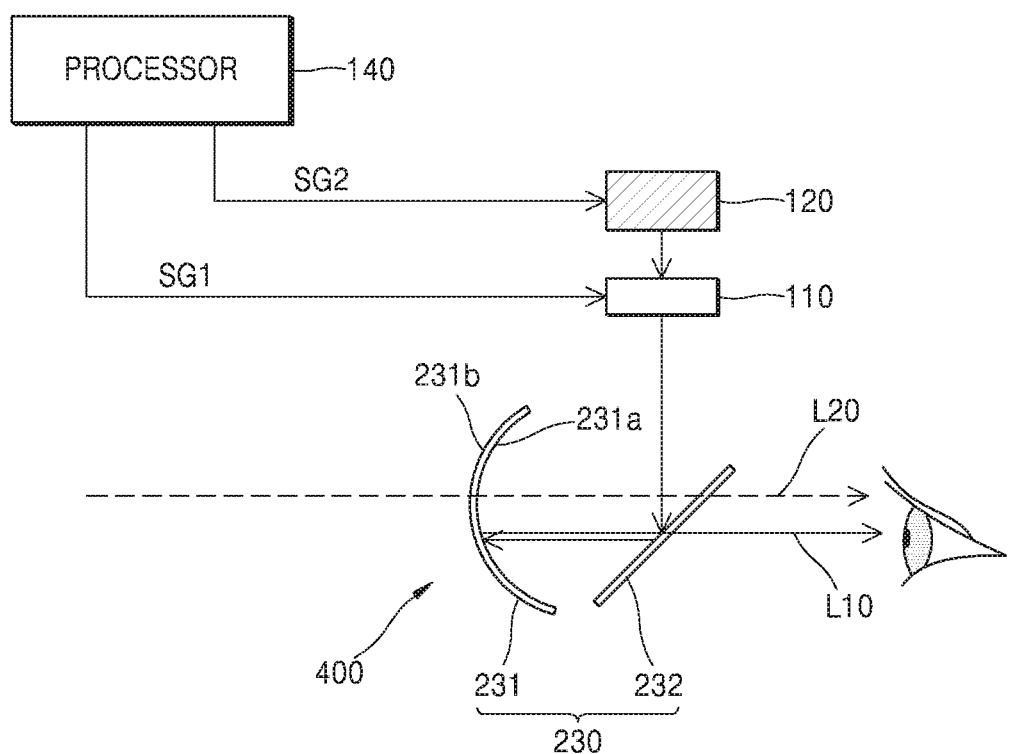
FIG. 11 is a schematic view schematically illustrating a structure and operation of a display apparatus according to another example embodiment.

The combiner member 130 described above may have an integral structure in which the focusing optical system 131 and the beam splitter 132 are fixed through the light guide plate 133 which is transparent. However, the structure of the combiner member 130 is not limited thereto and may have various other structures. For example, FIG. 11 is a schematic view illustrating a structure and operation of a display apparatus 400 according to another example embodiment. Referring to FIG. 11, the display apparatus 400 may include an image forming device 110, a combiner member 230, a driving device 120, and a processor 140.

The combiner member 230 may include a beam splitter 232 and a concave mirror 231. The beam splitter 232 may be a half mirror that reflects a portion of incident light and transmits the other portion of the incident light, or may be a polarization beam splitter light that reflects light having a first linear polarization component and transmits light having a second linear polarization component which is perpendicular to the first linear polarization component. The concave mirror 231 is configured to reflect light propagating from beam splitter 232 to focus the light on a viewer's eye. In addition, the concave mirror 231 may be configured to transmit light propagating from the outside to the viewer's eye. To this end, the concave mirror 231 may have a concave reflective surface 231a facing the beam splitter 232 and a light-transmissive surface 231b which is opposite the reflective surface 231a.

Figure 12:
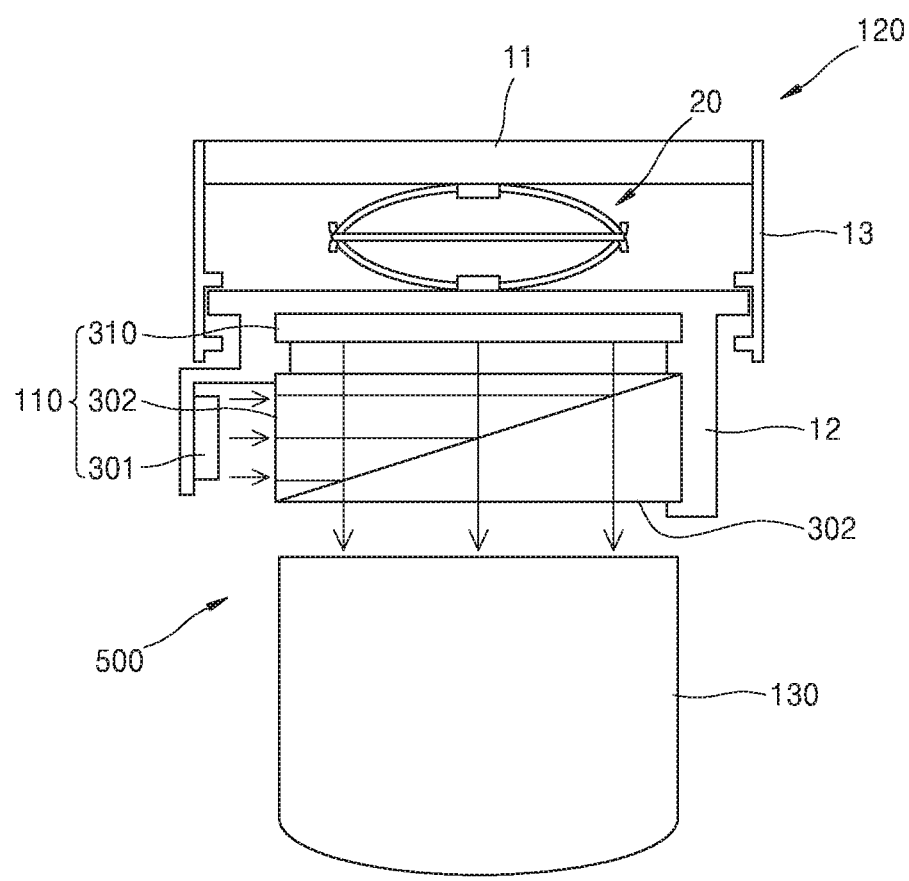
FIG. 12 is a view schematically illustrating a structure of an image forming device and a driving device of a display apparatus according to another example embodiment.

In addition, when the image forming device 110 is a non-emissive image forming device such as an LCoS device or an LCD device, elements in addition to the display panel may be fixed to the movable frame 12. For example, FIG. 12 schematically illustrates the configuration of an image forming device 110 and a driving device 120 of a display apparatus 500 according to another example embodiment. Referring to FIG. 12, a light source 301 configured to provide illumination light, a beam splitter 302 configured to adjust the path of the illumination light, and a spatial light modulator 310 may be fixed together to a movable frame 12.

The display apparatuses according to the above-described example embodiments may constitute wearable devices. In other words, the display apparatuses may be applied to wearable devices. For example, the display apparatuses may be applied to head mounted displays (HMD), glasses-type displays, goggle-type displays, or the like. Wearable electronic devices to which the display apparatuses of the above-described example embodiments are applied may be operated in conjunction with smartphones. The display apparatuses may be head-mounted, glasses-type, or goggle-type VR display apparatuses, AR display apparatuses, or MR display apparatuses which are capable of providing VR or providing virtual images together with a real outside landscape.

In addition, the display apparatuses may be provided in smartphones, and the smartphones may be used as VR, AR, or MR display apparatuses. For example, the display apparatuses may be applied to small electronic devices such as mobile electronic devices. In addition, the display apparatuses may be used in various other fields. For example, the display apparatuses may be used in the field of VR, AR, or MR and in other fields as well. For example, the display apparatuses may also be applied to small televisions or small monitors configured to be worn by users.

While the display apparatuses capable of multi-depth expression have been described according to example embodiments with reference to the accompanying drawings, the example embodiments are merely examples, and it will be understood by those of ordinary skill in the art that various modifications and other equivalent embodiments may be made therein without departing from the spirit and scope of the present disclosure. Therefore, the example embodiments described herein should be considered in a descriptive sense only and not for purposes of limitation. The scope of the present disclosure is defined not by the above description but by the following claims, and all differences within equivalent ranges of the scope of the present disclosure should be considered as being included in the scope of the present disclosure.

It should be understood that embodiments described herein should be considered in a descriptive sense only and not for purposes of limitation. Descriptions of features or aspects within each example embodiment should typically be considered as available for other similar features or aspects in other embodiments. While example embodiments have been described with reference to the figures, it will be understood by those of ordinary skill in the art that various changes in form and details may be made therein without departing from the spirit and scope as defined by the following claims.

What is claimed is:

1. A display apparatus comprising:
   an image forming device configured to form an image;
   an optical system configured to provide an output image by combining light containing an outside landscape with the image formed by the image forming device; and
   a driving device configured to adjust a distance between the image forming device and the optical system, wherein the driving device comprises:
a fixed frame;
a movable frame which faces the fixed frame and is movable;
an actuator configured to change a distance between the fixed frame and the movable frame, and comprising:
a first elastic bridge having a continuously curved surface which is convex toward the fixed frame;
a second elastic bridge having a continuously curved surface which is convex toward the movable frame; and
a variable length element fixed between both ends of the first elastic bridge and both ends of the second elastic bridge to extend from a first end point of the first elastic bridge and the second elastic bridge to a second end point of the first elastic bridge and the second elastic bridge, and respectively having a length that is variable; and
a fixing member configured to fix the distance between the fixed frame and the movable frame,
wherein the image forming device is fixed to the movable frame.

2. The display apparatus of claim 1, wherein the variable length element comprises a shape memory alloy or an electroactive polymer, and
wherein the length of the variable length element changes based on heat being applied to the variable length element.

3. The display apparatus of claim 1, wherein the first elastic bridge has elastic restoring force in a direction in which a radius of curvature of the first elastic bridge increases, and a center portion of the first elastic bridge is fixed to the fixed frame.

4. The display apparatus of claim 3, wherein the second elastic bridge has elastic restoring force in a direction in which a radius of curvature of the second elastic bridge increases, and a center portion of the second elastic bridge is fixed to the movable frame.

5. The display apparatus of claim 1, wherein the fixing member comprises a pair of side frames respectively fixed to opposite side edges of the fixed frame.

6. The display apparatus of claim 5, wherein the pair of side frames extend from the fixed frame toward the movable frame, and the pair of side frames have fixed ends fixed to the fixed frame and free ends which are opposite the fixed ends.

7. The display apparatus of claim 6, wherein the pair of side frames comprise a plurality of protrusions which protrude from surfaces of the free ends and are provided at different distances from the fixed frame, the plurality of protrusions being configured to contact with opposite sides of the movable frame and restrain movement of the movable frame.

8. The display apparatus of claim 6, wherein the pair of side frames are configured such that the free ends of the pair of side frames which face each other move away from each other while the distance between the fixed frame and the movable frame is changed and move closer to each other while the distance between the fixed frame and the movable frame is maintained.

9. The display apparatus of claim 8, wherein the pair of side frames comprise bimetal or piezoelectric elements which respectively bend or stretch based on a temperature control or an electrical control, and
wherein the pair of side frames are bent while the distance between the fixed frame and the movable frame is changed, and are stretched while the distance between the fixed frame and the movable frame is maintained.

10. The display apparatus of claim 8, wherein the fixing member further comprises variable length elements fixed between the fixed ends and the free ends and having variable lengths,
wherein the pair of side frames have elastic restoring force in directions in which the free ends face each other, and
wherein the variable length elements fixed between the fixed ends and the free ends are contracted while the distance between the fixed frame and the movable frame is changed.

11. The display apparatus of claim 1, wherein the fixing member comprises:
a pair of first rods configured to rotate and provided at both side edges of the fixed frame; and
a pair of second rods configured to rotate and provided at both side edges of the movable frame,
wherein end portions of the pair of first rods and end portions of the pair of second rods corresponding to the end portions of the pair of first rods are configured to contact each other and interfere with each other.

12. The display apparatus of claim 11, wherein the fixing member is configured to be switched between a first state in which the pair of first rods and the pair of second rods corresponding to the pair of first rods are fixed in a straight line with each other and a second state in which the pair of first rods and the pair of second rods corresponding to the pair of first rods are fixed at an inclined angle with respect to each other.

13. The display apparatus of claim 12, wherein the fixing member is switched from the second state to the first state based on the distance between the fixed frame and the movable frame being increased, and is switched from the first state to the second state based on the distance between the fixed frame and the movable frame being decreased.

14. The display apparatus of claim 12, wherein the end portions of the pair of first rods comprise recesses and barriers surrounding the recesses,
wherein a width of each of the end portions of the pair of second rods is less than a width of each of the recesses, and each of the end portions of the pair of second rods are provided in each of the recesses, and
wherein the fixing member is configured such that the end portions of the pair of second rods are in contact with bottom surfaces of the recesses in the first state and are in contact with inner walls of the barriers in the second state.

15. The display apparatus of claim 12, wherein the end portions of the pair of second rods comprise recesses and barriers surrounding the recesses,
wherein a width of each of the end portions of the pair of first rods is less than a width of each of the recesses and each of the end portions of the pair of first rods are provided in each of the recesses, and
wherein the fixing member is configured such that the end portions of the pair of first rods are in contact with bottom surfaces of the recesses in the first state and are in contact with inner walls of the barriers in the second state.

16. The display apparatus of claim 12, wherein the fixing member further comprises variable length elements respectively connected between both side edges of the fixed frame and the end portions of the pair of first rods and respectively having a length that is variable, and wherein the variable length elements respectively connected between both side edges of the fixed frame and the end portions of the pair of first rods are contracted based on the fixing member being switched from the first state to the second state.

17. The display apparatus of claim 12, wherein the fixing member further comprises variable length elements respectively connected between both side edges of the movable frame and the end portions of the pair of second rods, and respectively having a length that is variable, and
wherein the variable length elements respectively connected between both side edges of the movable frame and the end portions of the pair of second rods are contracted based on the fixing member being switched from the first state to the second state.

18. The display apparatus of claim 12, wherein the end portions of the pair of first rods and the end portions of the pair of second rods corresponding to the end portions of the pair of first rods have complementary shapes and are configured to be engaged with each other,
wherein the fixing member further comprises variable length elements respectively connected between both side edges of the movable frame and the end portions of the pair of second rods, and respectively having a length that is variable, and
wherein the variable length elements respectively connected between both side edges of the movable frame and the end portions of the pair of second rods are contracted based on the fixing member being switched from the first state to the second state.

19. The display apparatus of claim 1, further comprising a processor configured to determine the distance between the image forming device and the optical system based on depth information of the image to be displayed and control the driving device.

20. The display apparatus of claim 1, wherein the display apparatus is a virtual reality (VR), augmented reality (AR), or mixed reality (MR) display apparatus which is implemented in a head mounted type apparatus, a glasses type apparatus, or a goggle type apparatus.

21. A display apparatus comprising:
an image forming device configured to form an image;
an optical system configured to provide an output image by combining light containing an outside landscape with the image formed by the image forming device; and
a driving device configured to adjust a distance between the image forming device and the optical system,
wherein the driving device comprises:
a fixed frame;
a movable frame which faces the fixed frame and is movable;
an actuator configured to change a distance between the fixed frame and the movable frame; and
a fixing member configured to fix the distance between the fixed frame and the movable frame,
wherein the image forming device is fixed to the movable frame, wherein the fixing member comprises:
a pair of first rods configured to rotate and provided at both side edges of the fixed frame; and
a pair of second rods configured to rotate and provided at both side edges of the movable frame,
wherein end portions of the pair of first rods and end portions of the pair of second rods corresponding to the end portions of the pair of first rods are configured to contact each other and interfere with each other,
wherein the actuator comprises:
first variable length elements connected between the fixed frame and inner lateral surfaces of the pair of first rods, and respectively having a length that is variable; and
second variable length elements connected between the fixed frame and outer lateral surfaces of the pair of first rods, and respectively having a length that is variable.

22. The display apparatus of claim 21, wherein the fixing member is configured to be switched between a first state in which the pair of first rods and the pair of second rods corresponding to the pair of first rods are fixed in a straight line with each other and a second state in which the pair of first rods and the pair of second rods corresponding to the pair of first rods are fixed at an inclined angle with respect to each other,
wherein based on the distance between the fixed frame and the movable frame being increased, the first variable length elements are shortened and the second variable length elements are elongated to switch the fixing member from the second state to the first state, and
based on the distance between the fixed frame and the movable frame being decreased, the first variable length elements are elongated and the second variable length elements are shortened to switch the fixing member from the first state to the second state.

23. A display apparatus comprising:
an image forming device configured to form an image;
an optical system configured to provide an output image by combining light containing an outside landscape with the image formed by the image forming device; and
a driving device configured to adjust a distance between the image forming device and the optical system,
wherein the driving device comprises:
a fixed frame;
a movable frame which faces the fixed frame and is movable;
an actuator configured to change a distance between the fixed frame and the movable frame; and
a fixing member configured to fix the distance between the fixed frame and the movable frame,
wherein the image forming device is fixed to the movable frame,
wherein the fixing member comprises:
a pair of first rods configured to rotate and provided at both side edges of the fixed frame; and
a pair of second rods configured to rotate and provided at both side edges of the movable frame,
wherein end portions of the pair of first rods and end portions of the pair of second rods corresponding to the end portions of the pair of first rods are configured to contact each other and interfere with each other,
wherein the actuator comprises:
first variable length elements connected between the movable frame and inner lateral surfaces of the pair of second rods, and respectively having a length that is variable; and
second variable length elements connected between the movable frame and outer lateral surfaces of the pair of second rods, and respectively having a length that is variable.

24. A display apparatus comprising:
an image forming device configured to form an image;
an optical system configured to provide an output image by combining light emitted from an outside of the display apparatus and the image formed by the image forming device; and
a driving device configured to change a distance between the image forming device and the optical system,
wherein the driving device comprises:
- a fixed frame;
- a movable frame which faces the fixed frame and is movable;
- an actuator configured to control a distance between the fixed frame and the movable frame based on a voltage applied, and comprising:
  - a first elastic bridge having a continuously curved surface which is convex toward the fixed frame;
  - a second elastic bridge having a continuously curved surface which is convex toward the movable frame; and
  - a variable length element fixed between both ends of the first elastic bridge and both ends of the second elastic bridge to extend from a first end point of the first elastic bridge and the second elastic bridge to a second end point of the first elastic bridge and the second elastic bridge, and respectively having a length that is variable; and
- a fixing member configured to fix the distance between the fixed frame and the movable frame.

25. The display apparatus of claim 24, wherein the voltage is applied to the actuator while the distance between the fixed frame and the movable frame changes, and the voltage is not applied to the actuator while the distance between the fixed frame and the movable frame is maintained.

26. The display apparatus of claim 25, wherein power consumed by the driving device while the distance between the fixed frame and the movable frame is maintained is less than power consumed by the driving device while the distance between the fixed frame and the movable frame changes.

* * * * *